US010462760B2

(12) United States Patent
Jiang et al.

(10) Patent No.: US 10,462,760 B2
(45) Date of Patent: Oct. 29, 2019

(54) METHOD, NODE, AND SYSTEM FOR DETECTING CLOCK SYNCHRONIZATION PATH

(71) Applicant: Huawei Technologies Co., Ltd., Shenzhen (CN)

(72) Inventors: Yuanlong Jiang, Shenzhen (CN); Jinchun Xu, Shenzhen (CN); Xian Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/961,532

(22) Filed: Apr. 24, 2018

(65) Prior Publication Data
US 2018/0242267 A1  Aug. 23, 2018

Related U.S. Application Data

(63) Continuation of application No. PCT/CN2016/102751, filed on Oct. 20, 2016.

(30) Foreign Application Priority Data

Oct. 30, 2015 (CN) .......................... 2015 1 0728622

(51) Int. Cl.
*H04W 56/00* (2009.01)
*H04W 24/04* (2009.01)
(Continued)

(52) U.S. Cl.
CPC ......... *H04W 56/001* (2013.01); *H04J 3/0673* (2013.01); *H04J 3/0679* (2013.01);
(Continued)

(58) Field of Classification Search
CPC ... H04W 56/001; H04W 24/04; H04W 56/00; H04W 84/00; H04L 41/0681; H04L 41/12; H04L 43/10; H04L 45/42
See application file for complete search history.

(56) References Cited

U.S. PATENT DOCUMENTS 6,711,411 B1   3/2004  Ruffini
7,436,813 B2  10/2008  Kim et al.
(Continued)

FOREIGN PATENT DOCUMENTS

CN   101252426 A   8/2008
CN   101262401 A   9/2008
(Continued)

OTHER PUBLICATIONS

Machine Translation and Abstract of Chinese Publication No. CN101252426, Aug. 27, 2008, 10 pages.
(Continued)

*Primary Examiner* — Ronald B Abelson
(74) *Attorney, Agent, or Firm* — Conley Rose, P.C.

(57) ABSTRACT

A method, node, and system for detecting a clock synchronization path, where the method includes generating, by a first node, a synchronization detection request message, sending the synchronization detection request message to a second node, where the synchronization detection request message includes an identifier (ID) of the first node, generating, by the second node, a synchronization detection response message according to the synchronization detection request message, sending the synchronization detection response message to the first node, where the synchronization detection response message includes clock topology information of the second node and the ID of the first node, and obtaining, by the first node, a first detection result according to the synchronization detection response message, where the first detection result indicates a status of a
(Continued)

clock synchronization path between the first node and the second node.

26 Claims, 9 Drawing Sheets

(51) Int. Cl.
| | |
|---|---|
| H04W 84/00 | (2009.01) |
| H04L 12/24 | (2006.01) |
| H04L 12/26 | (2006.01) |
| H04L 12/717 | (2013.01) |
| H04J 3/06 | (2006.01) |
| H04L 12/751 | (2013.01) |

(52) U.S. Cl.
CPC ........ *H04J 3/0697* (2013.01); *H04L 41/0681* (2013.01); *H04L 41/12* (2013.01); *H04L 43/10* (2013.01); *H04L 45/42* (2013.01); *H04W 24/04* (2013.01); *H04W 56/00* (2013.01); *H04W 84/00* (2013.01); *H04L 45/02* (2013.01)

(56) References Cited

U.S. PATENT DOCUMENTS

| | | |
|---|---|---|
| 2013/0235878 A1 | 9/2013 | Hirota |
| 2014/0181320 A1 | 6/2014 | Farkas |

FOREIGN PATENT DOCUMENTS

| | | |
|---|---|---|
| CN | 101459502 A | 6/2009 |
| CN | 102347850 A | 2/2012 |
| CN | 104507155 A | 4/2015 |
| CN | 104954153 A | 9/2015 |
| JP | 2006087065 A | 3/2006 |
| JP | 2013187766 A | 9/2013 |

OTHER PUBLICATIONS

Machine Translation and Abstract of Chinese Publication No. CN101262401, Sep. 10, 2008, 9 pages.
Machine Translation and Abstract of Chinese Publication No. CN101459502, Jun. 17, 2009, 18 pages.
Machine Translation and Abstract of Chinese Publication No. CN102347850, Feb. 8, 2012, 19 pages.
Machine Translation and Abstract of Chinese Publication No. CN104507155, Apr. 8, 2015, 11 pages.
Machine Translation and Abstract of Chinese Publication No. CN104954153, Sep. 30, 2015, 25 pages.
"IEEE Standard for Local and metropolitan area networks—Timing and Synchronization for Time-Sensitive Applications in Bridged Local Area Networks—Corrigendum 1: Technical and Editorial Corrections," IEEE Std 802.1AS™-2011/Cor 1-2013, Aug. 23, 2013, 128 pages.
"IEEE Standard for a Precision Clock Synchronization Protocol for Networked Measurement and Control Systems, IEEE Instrumentation and Measurement Society," IEEE Std 1588™-2008, Jul. 24, 2008, 289 pages.
Foreign Communication From a Counterpart Application, Chinese Application No. 201510728622.0, Chinese Office Action dated Dec. 27, 2017, 7 pages.
Foreign Communication From a Counterpart Application, PCT Application No. PCT/CN2016/102751, English Translation of International Search Report dated Jan. 25, 2017, 2 pages.
Foreign Communication From a Counterpart Application, European Application No. 16858956.2, Extended European Search Report dated Jun. 28, 2018, 9 pages.
Machine Translation and Abstract of Japanese Publication No. JP2006087065, Mar. 30, 2006, 86 pages.
Foreign Communication From a Counterpart Application, Japanese Application No. 2018-518619, Japanese Office Action dated Mar. 25, 2019, 4 pages.
Foreign Communication From a Counterpart Application, Japanese Application No. 2018-518619, English Translation of Japanese Office Action dated Mar. 25, 2019, 5 pages.

| Req./Reply | Sync Type | Length |
|---|---|---|
| 1st Sync Topology | | |
| 1st Sync States | | |
| ... | | |
| Kth Sync Topology | | |
| Kth Sync States | | |

METHOD, NODE, AND SYSTEM FOR DETECTING CLOCK SYNCHRONIZATION PATH

CROSS-REFERENCE TO RELATED APPLICATIONS

This application is a continuation of International Patent Application No. PCT/CN2016/102751 filed on Oct. 20, 2016, which claims priority to Chinese Patent Application No. 201510728622.0 filed on Oct. 30, 2015. The disclosures of the aforementioned applications are hereby incorporated by reference in their entireties.

TECHNICAL FIELD

The present application relates to the field of mobile communications technologies, and in particular, to a method, node, and system for detecting a clock synchronization path.

BACKGROUND

In a modern communications network, most teleservices require a frequency difference or a phase difference between network-wide devices to be kept within an appropriate error range for normal running, that is, have a network clock synchronization requirement. Clock synchronization includes frequency synchronization and phase synchronization. Frequency synchronization indicates that a specific strict relationship is kept between frequencies or phases of signals, that is, a constant phase difference is kept between the signals within a relatively small range, for example, less than 100 nanoseconds. Currently, main clock synchronization technologies include the Institute of Electrical and Electronics Engineers (IEEE) 1588v2 and Synchronous Ethernet (SyncE). SyncE is used to implement frequency synchronization, and IEEE 1588v2 is mainly used to implement time synchronization, that is, phase synchronization. A base station in a third generation (3G) or later-generation mobile network obtains a clock synchronization signal from a bearer network of the base station to perform frequency synchronization and time synchronization. Normal synchronization and normal service running in the mobile network can be ensured only when clock synchronization is implemented on all devices in the bearer network.

In a mobile bearer network, for example, a packet transport network (PTN), or an Internet Protocol (IP) radio access network (RAN), in a process in which a device in the mobile bearer network needs to perform networking and interconnection with a device in another network, clock asynchronization may exist between the two interconnected devices. Currently, whether a problem of clock asynchronization exists is determined by manually analyzing clock synchronization signals of two interconnected devices and/or manually analyzing a faulty node on a clock synchronization path. Therefore, efficiency is relatively low. The foregoing clock synchronization problem also exists in another communications network that has a stringent delay requirement, for example, a power control network, or a low-delay Ethernet compliant with IEEE 802.1AS.

SUMMARY

Embodiments of the present application provide a method, node, and system for detecting a clock synchronization path, to help improve working efficiency of obtaining a status of a clock synchronization path.

A first aspect of the embodiments of the present application provides a method for detecting a clock synchronization path, and the method may be applied to a mobile bearer network. The mobile bearer network includes a base transceiver station (BTS), a building integrated timing supply (BITS), and a plurality of nodes. A first node in the method is a node that initiates clock synchronization detection. The method includes generating, by the first node, a synchronization detection request message, where the synchronization detection request message includes an identifier (ID) of the first node, sending, by the first node, the synchronization detection request message to a second node, receiving, by the first node, a first synchronization detection response message sent by the second node, where the first synchronization detection response message includes clock topology information of the second node and the ID of the first node, and obtaining, by the first node, a first detection result according to the first synchronization detection response message, where the first detection result is used to indicate a status of a clock synchronization path between the first node and the second node.

In a possible implementation, the first node receives a second synchronization detection response message sent by a third node that performs clock synchronization signal transmission with the second node, where the second synchronization detection response message includes clock topology information of the third node, the clock topology information of the second node, and the ID of the first node, and the first node obtains a second detection result according to the second synchronization detection response message, where the second detection result is used to indicate a status of a clock synchronization path between the first node and the third node, and the clock synchronization path between the first node and the third node passes through the second node.

By analogy, the first node may receive at least two synchronization detection response messages, and may obtain at least two detection results. Each detection result is used to indicate a status of a clock synchronization path between the first node and a node that sends a synchronization detection response message. The first node may obtain, according to the at least two detection results, a clock synchronization path of the first node by means of analysis to help determine a node with clock asynchronization according to the clock synchronization path, that is, a node that does not belong to the clock synchronization path on which the first node is located is a node with clock asynchronization.

In a possible implementation, the first node sends the synchronization detection request message to the second node using a port used to transmit a clock synchronization signal, where the port used to transmit a clock synchronization signal is a port that is on the first node and that can transmit a frequency synchronization signal to the second node.

In a possible implementation, the synchronization detection request message further includes a first synchronization type, the first synchronization type is used to represent frequency synchronization, the synchronization detection request message is used to request to detect a frequency synchronization path, and that the first node sends the synchronization detection request message to the second node using a port used to transmit a clock synchronization signal includes determining, by the first node according to the first synchronization type in the synchronization detection request message and the port used to transmit a clock synchronization signal, a port used to transmit a frequency synchronization signal, where the port used to transmit a frequency synchronization signal is a port that is on the first node and that can transmit a frequency synchronization signal to the second node, and sending, by the first node, the synchronization detection request message to the second node using the port used to transmit a frequency synchronization signal.

In a possible implementation, the synchronization detection request message further includes a second synchronization type, the second synchronization type is used to represent time synchronization, the synchronization detection request message is used to request to detect a time synchronization path, and that the first node sends the synchronization detection request message to the second node using a port used to transmit a clock synchronization signal includes determining, by the first node according to the second synchronization type in the synchronization detection request message and the port used to transmit a clock synchronization signal, a port used to transmit a time synchronization signal, where the port used to transmit a time synchronization signal is a port that is on the first node and that can transmit a time synchronization signal to the second node, and sending, by the first node, the synchronization detection request message to the second node using the port used to transmit a time synchronization signal.

In a possible implementation, before generating, by the first node, a synchronization detection request message, the method further includes determining, by the first node, whether a clock tracing node of the first node is traced, where the clock tracing node of the first node is a node that is configured to directly provide a clock synchronization signal for the first node, and determining, by the first node, that the clock tracing node of the first node is traced.

In a possible implementation, before generating the synchronization detection request message, the first node determines whether the first node initiates clock synchronization detection, and the first node may determine whether the first node initiates clock synchronization detection by detecting whether the first node loses a clock source of the first node or whether a signal of the BTS is abnormal. When determining that the clock source of the first node is lost or when detecting that the signal of the BTS is abnormal, the first node determines that the first node initiates clock synchronization detection, that is, the first node generates the synchronization detection request message.

In a possible implementation, the first detection result includes a first synchronization path, the first synchronization path is the clock synchronization path between the first node and the second node, and the clock topology information of the second node includes an ID of the second node, and obtaining, by the first node, a first detection result according to the first synchronization detection response message includes obtaining, by the first node, the first synchronization path according to the ID of the second node and the ID of the first node that are included in the first synchronization detection response message.

In a possible implementation, the clock topology information of the second node includes the ID of the second node, the first synchronization detection response message further includes first alarm information, the first alarm information is used to indicate that a physical layer fault exists in the node that sends the first synchronization detection response message, the first detection result further includes a first alarm message, and the first alarm message is used to advertise that a physical layer fault exists in the node, and obtaining, by the first node, a first detection result according to the first synchronization detection response message further includes determining, by the first node according to the first alarm information included in the first synchronization detection response message, that a physical layer fault exists in the second node, and generating, by the first node, the first alarm message according to the ID of the second node that is included in the first synchronization detection response message, where the first alarm message includes the ID of the second node.

In a possible implementation, the clock topology information of the second node includes the ID of the second node, the first synchronization detection response message further includes second alarm information, the second alarm information is used to indicate that the node sending the first synchronization detection response message detects that a clock source of the node is abnormal, the first detection result further includes a second alarm message, and the second alarm message is used to advertise that a clock source of the node is abnormal, and the obtaining, by the first node, a first detection result according to the first synchronization detection response message further includes determining, by the first node according to the second alarm information included in the first synchronization detection response message, that the clock source of the second node is abnormal, and generating, by the first node, the second alarm message according to the ID of the second node that is included in the first synchronization detection response message, where the second alarm message includes the ID of the second node.

In a possible implementation, the clock topology information of the second node includes the ID of the second node, the first synchronization detection response message further includes performance monitoring information, the performance monitoring information is used to determine frequency offset performance of the node that sends the first synchronization detection response message, the first detection result further includes a performance exception message, and the performance exception message is used to advertise that frequency offset performance of the node degrades, and obtaining, by the first node, a first detection result according to the first synchronization detection response message further includes determining, by the first node according to the performance monitoring information included in the first synchronization detection response message, that the frequency offset performance of the second node degrades, and generating, by the first node, the performance exception message according to the ID of the second node that is included in the first synchronization detection response message, where the performance exception message includes the ID of the second node.

In a possible implementation, the clock topology information of the second node includes an ID of the second node, the first synchronization detection response message further includes first alarm information, the first alarm information is used to indicate that a physical layer fault exists in the node that sends the first synchronization detection response message, the first detection result includes a first alarm message, and the first alarm message is used to advertise that a physical layer fault exists in the node, and obtaining, by the first node, a first detection result according to the first synchronization detection response message includes determining, by the first node according to the first alarm information included in the first synchronization detection response message, that a physical layer fault exists in the second node, and generating, by the first node, the first alarm message according to the ID of the second node that is included in the first synchronization detection response message, where the first alarm message includes the ID of the second node.

In a possible implementation, the clock topology information of the second node includes the ID of the second node, the first synchronization detection response message further includes second alarm information, the second alarm information is used to indicate that the node sending the first synchronization detection response message detects that a clock source of the node is abnormal, the first detection result includes a second alarm message, and the second alarm message is used to advertise that a clock source of the node is abnormal, and obtaining, by the first node, a first detection result according to the first synchronization detection response message includes determining, by the first node according to the second alarm information included in the first synchronization detection response message, that the clock source of the second node is abnormal, and generating, by the first node, the second alarm message according to the ID of the second node that is included in the first synchronization detection response message, where the second alarm message includes the ID of the second node.

In a possible implementation, the clock topology information of the second node includes the ID of the second node, the first synchronization detection response message further includes performance monitoring information, the performance monitoring information is used to indicate frequency offset performance of the node that sends the first synchronization detection response message, the first detection result includes a performance exception message, and the performance exception message is used to advertise that frequency offset performance of the node degrades, and obtaining, by the first node, a first detection result according to the first synchronization detection response message further includes determining, by the first node according to the performance monitoring information included in the first synchronization detection response message, that the frequency offset performance of the second node degrades, and generating, by the first node, the performance exception message according to the ID of the second node that is included in the first synchronization detection response message, where the performance exception message includes the ID of the second node.

A second aspect of the embodiments of the present application provides another method for detecting a clock synchronization path, the method is applied to a mobile bearer network, and the mobile bearer network includes a BTS, a BITS, and a plurality of nodes. The method includes receiving, by a second node, a first synchronization detection request message sent by a first node, where the first synchronization detection request message includes clock topology information of the first node, generating, by the second node, a synchronization detection response message according to the first synchronization detection request message, where the synchronization detection response message includes clock topology information of the second node and the clock topology information of the first node, and sending, by the second node, the synchronization detection response message.

In a possible implementation, after receiving, by a second node, a first synchronization detection request message sent by a first node, the method further includes determining, by the second node, that a third node exists, and generating a second synchronization detection request message, where the third node is a node that can transmit a frequency synchronization signal to the second node, and the second synchronization detection request message includes the clock topology information of the first node and the clock topology information of the second node, and sending, by the second node, the second synchronization detection request message to the third node.

In a possible implementation, the third node is a clock tracing node of the second node, and the sending, by the second node, the second synchronization detection request message to the third node includes sending, by the second node, the second synchronization detection request message to the third node using a port used to receive a clock synchronization signal, where the port used to receive a clock synchronization signal is a port that is on the second node and that receives a clock synchronization signal provided by the third node.

In a possible implementation, the first node is a node that initiates clock synchronization detection, the clock topology information of the first node is an ID of the first node, and sending, by the second node, the synchronization detection response message includes sending, by the second node, the synchronization detection response message to the first node according to the ID of the first node that is included in the first synchronization detection request message.

In a possible implementation, the first synchronization detection request message further includes clock topology information of a fourth node, the clock topology information of the fourth node is an ID of the fourth node, the synchronization detection response message further includes the ID of the fourth node, the fourth node is a node that initiates clock synchronization detection, and sending, by the second node, the synchronization detection response message includes sending, by the second node, the synchronization detection response message to the fourth node according to the ID of the fourth node that is included in the first synchronization detection request message.

In a possible implementation, the first node is a clock tracing node of the second node, and generating, by the second node, a synchronization detection response message according to the first synchronization detection request message includes determining, by the second node, whether a port that receives the first synchronization detection request message is a port used to transmit a clock synchronization signal, and generating, by the second node, the synchronization detection response message after determining that the port that receives the first synchronization detection request message is the port used to transmit a clock synchronization signal.

In a possible implementation, generating, by the second node, a synchronization detection response message according to the first synchronization detection request message includes determining, by the second node, that a port that receives the first synchronization detection request message is a port used to transmit a frequency synchronization signal, and adding, by the second node, a first synchronization type to the synchronization detection response message, where the first synchronization type is used to represent frequency synchronization, and the first synchronization detection request message is used to request to detect a frequency synchronization path.

In a possible implementation, generating, by the second node, a synchronization detection response message according to the first synchronization detection request message includes determining, by the second node, that a port that receives the first synchronization detection request message is a port used to transmit a time synchronization signal, and adding, by the second node, a second synchronization type to the synchronization detection response message, where the second synchronization type is used to represent time synchronization, and the first synchronization detection request message is used to request to detect a time synchronization path.

In a possible implementation, the method further includes adding, by the second node, first alarm information to the synchronization detection response message after detecting that a physical layer fault exists in the second node, where the first alarm information is used to indicate that a physical layer fault exists in the node that sends the synchronization detection response message.

In a possible implementation, the method further includes adding, by the second node, second alarm information to the synchronization detection response message after detecting that a clock source of the second node is abnormal, where the second alarm information is used to indicate that the node sending the synchronization detection response message detects that the clock source of the node is abnormal.

In a possible implementation, the method further includes adding, by the second node, performance monitoring information to the synchronization detection response message after detecting that frequency offset performance of the second node degrades, where the performance monitoring information is used to determine the frequency offset performance of the node that sends the synchronization detection response message.

In a possible implementation of the first aspect or the second aspect, the first node is a clock tracing node of the second node, and the clock tracing node of the second node is a node that is configured to directly provide a clock synchronization signal for the second node, or the second node is the clock tracing node of the first node, and the clock tracing node of the first node is a node that is configured to directly provide a clock synchronization signal for the first node.

In a possible implementation of the first aspect or the second aspect, the first node is a clock tracing node of the second node, the clock tracing node of the second node is a node that is configured to directly provide a clock synchronization signal for the second node, the clock topology information of the second node includes the ID of the second node and a port list of the second node, and the port list of the second node includes a port that is of the second node and that is used to receive a clock synchronization signal and N ports that are of the second node and that are used to send clock synchronization signals.

A third aspect of the embodiments of the present application provides a first node, including a message generation unit configured to generate a synchronization detection request message, where the synchronization detection request message includes an ID of the first node, a message sending unit configured to send the synchronization detection request message to a second node, a message receiving unit configured to receive a first synchronization detection response message sent by the second node, where the first synchronization detection response message includes clock topology information of the second node and the ID of the first node, and a result obtaining unit configured to obtain a first detection result according to the first synchronization detection response message, where the first detection result is used to indicate a status of a clock synchronization path between the first node and the second node.

In a possible implementation, the message receiving unit is further configured to receive a second synchronization detection response message sent by a third node, where the second synchronization detection response message includes clock topology information of the third node, the clock topology information of the second node, and the ID of the first node, and the result obtaining unit is further configured to obtain a second detection result according to the second synchronization detection response message, where the second detection result is used to indicate a status of a clock synchronization path between the first node and the third node, and the clock synchronization path between the first node and the third node passes through the second node.

In a possible implementation, the message sending unit is further configured to send the synchronization detection request message to the second node using a port used to transmit a clock synchronization signal, where the port used to transmit a clock synchronization signal is a port that is on the first node and that can transmit a frequency synchronization signal to the second node.

In a possible implementation, the synchronization detection request message further includes a first synchronization type, the first synchronization type is used to represent frequency synchronization, and the synchronization detection request message is used to request to detect a frequency synchronization path, and the message sending unit includes a first port determining unit configured to determine, according to the first synchronization type in the synchronization detection request message and the port used to transmit a clock synchronization signal, a port used to transmit a frequency synchronization signal, where the port used to transmit a frequency synchronization signal is a port that is on the first node and that can transmit a frequency synchronization signal to the second node, and a first message sending unit configured to send the synchronization detection request message to the second node using the port used to transmit a frequency synchronization signal and that is determined by the first port determining unit.

In a possible implementation, the synchronization detection request message further includes a second synchronization type, the second synchronization type is used to represent time synchronization, and the synchronization detection request message is used to request to detect a time synchronization path, and the message sending unit includes a second port determining unit configured to determine, according to the second synchronization type in the synchronization detection request message and the port used to transmit a clock synchronization signal, a port used to transmit a time synchronization signal, where the port used to transmit a time synchronization signal is a port that is on the first node and that can transmit a time synchronization signal to the second node, and a second message sending unit configured to send the synchronization detection request message to the second node using the port used to transmit a time synchronization signal and that is determined by the second port determining unit.

In a possible implementation, the first node further includes a determining unit, and the determining unit is configured to determine whether a clock tracing node of the first node is traced, where the clock tracing node of the first node is a node that is configured to directly provide a clock synchronization signal for the first node, and the message generation unit is further configured to generate the synchronization detection request message after the determining unit determines that the clock tracing node of the first node is traced.

In a possible implementation, the first detection result includes a first synchronization path, the first synchronization path is the clock synchronization path between the first node and the second node, and the clock topology information of the second node includes an ID of the second node, and the result obtaining unit is further configured to obtain the first synchronization path according to the ID of the second node and the ID of the first node that are included in the first synchronization detection response message.

In a possible implementation, the clock topology information of the second node includes the ID of the second node, the first synchronization detection response message further includes first alarm information, the first alarm information is used to indicate that a physical layer fault exists in the node that sends the first synchronization detection response message, the first detection result further includes a first alarm message, and the first alarm message is used to advertise that a physical layer fault exists in the node, and the result obtaining unit is further configured to determine, according to the first alarm information included in the first synchronization detection response message, that a physical layer fault exists in the second node, and generate the first alarm message according to the ID of the second node that is included in the first synchronization detection response message, where the first alarm message includes the ID of the second node.

In a possible implementation, the clock topology information of the second node includes the ID of the second node, the first synchronization detection response message further includes second alarm information, the second alarm information is used to indicate that the node sending the first synchronization detection response message detects that a clock source of the node is abnormal, the first detection result further includes a second alarm message, and the second alarm message is used to advertise that a clock source of the node is abnormal, and the result obtaining unit is further configured to determine, according to the second alarm information included in the first synchronization detection response message, that the clock source of the second node is abnormal, and generate the second alarm message according to the ID of the second node that is included in the first synchronization detection response message, where the second alarm message includes the ID of the second node.

In a possible implementation, the clock topology information of the second node includes the ID of the second node, the first synchronization detection response message further includes performance monitoring information, the performance monitoring information is used to determine frequency offset performance of the node that sends the first synchronization detection response message, the first detection result further includes a performance exception message, and the performance exception message is used to advertise that frequency offset performance of the node degrades, and the result obtaining unit is further configured to determine, according to the performance monitoring information included in the first synchronization detection response message, that the frequency offset performance of the second node degrades, and generate the performance exception message according to the ID of the second node that is included in the first synchronization detection response message, where the performance exception message includes the ID of the second node.

For a specific implementation of the first node, refer to the method for detecting a clock synchronization path described in the first aspect.

A fourth aspect of the embodiments of the present application provides a second node, including a request message receiving unit configured to receive a first synchronization detection request message sent by a first node, where the first synchronization detection request message includes clock topology information of the first node, a response message generation unit configured to generate a synchronization detection response message according to the first synchronization detection request message, where the synchronization detection response message includes clock topology information of the second node and the clock topology information of the first node, and a response message sending unit configured to send the synchronization detection response message.

In a possible implementation, the second node further includes a node determining unit configured to determine that a third node exists, a request message generation unit configured to generate a second synchronization detection request message according to the first synchronization detection request message, where the third node is a node that can transmit a frequency synchronization signal to the second node, and the second synchronization detection request message includes the clock topology information of the first node and the clock topology information of the second node, and a request message sending unit configured to send the second synchronization detection request message to the third node.

In a possible implementation, the third node is a clock tracing node of the second node, and the clock tracing node of the second node is a node that is configured to directly provide a clock synchronization signal for the second node, and the request message sending unit is further configured to send the second synchronization detection request message to the third node using a port used to receive a clock synchronization signal, where the port used to receive a clock synchronization signal is a port that is on the second node and that receives a clock synchronization signal provided by the third node.

In a possible implementation, the first node is a node that initiates clock synchronization detection, the clock topology information of the first node is an ID of the first node, and the response message sending unit is further configured to send the synchronization detection response message to the first node according to the ID of the first node that is included in the first synchronization detection request message.

In a possible implementation, the first synchronization detection request message further includes clock topology information of a fourth node, the synchronization detection response message further includes the clock topology information of the fourth node, the clock topology information of the fourth node is an ID of the fourth node, the fourth node is a node that initiates clock synchronization detection, and the response message sending unit is further configured to send the synchronization detection response message to the fourth node according to the ID of the fourth node that is included in the first synchronization detection request message.

In a possible implementation, the first node is a clock tracing node of the second node, the clock tracing node of the second node is a node that is configured to directly provide a clock synchronization signal for the second node, and the response message generation unit includes a port determining unit configured to determine whether a port that is used by the request message receiving unit to receive the first synchronization detection request message is a port used to transmit a clock synchronization signal, and a message generation unit configured to generate the synchronization detection response message after it is determined that the port that receives the first synchronization detection request message is the port used to transmit a clock synchronization signal.

In a possible implementation, the response message generation unit includes a port determining unit configured to determine that a port that receives the first synchronization detection request message is a port used to transmit a frequency synchronization signal, and a message generation unit configured to add a first synchronization type to the synchronization detection response message, where the first synchronization type is used to represent frequency synchronization, and the first synchronization detection request message is used to request to detect a frequency synchronization path.

In a possible implementation, the response message generation unit includes a port determining unit configured to determine that a port that receives the first synchronization detection request message is a port used to transmit a time synchronization signal, and a message generation unit configured to add a second synchronization type to the synchronization detection response message, where the second synchronization type is used to represent time synchronization, and the first synchronization detection request message is used to request to detect a time synchronization path.

In a possible implementation, the second node further includes a first adding unit configured to add first alarm information to the synchronization detection response message after it is detected that a physical layer fault exists in the second node, where the first alarm information is used to indicate that a physical layer fault exists in the node that sends the synchronization detection response message.

In a possible implementation, the second node further includes a second adding unit configured to add second alarm information to the synchronization detection response message after it is detected that a clock source of the second node is abnormal, where the second alarm information is used to indicate that the node sending the synchronization detection response message detects that the clock source of the node is abnormal.

In a possible implementation, the second node further includes a performance information adding unit configured to add performance monitoring information to the synchronization detection response message after it is detected that frequency offset performance of the second node degrades, where the performance monitoring information is used to indicate that the frequency offset performance of the node that sends the first synchronization detection response message degrades.

For a specific implementation of the second node, refer to the method for detecting a clock synchronization path described in the second aspect.

A fifth aspect of the embodiments of the present application provides a system for detecting a clock synchronization path, and the system includes the first node according to the third aspect and the second node according to the fourth aspect.

In the embodiments of the present application, the first node may initiate clock synchronization detection, that is, the first node generates the synchronization detection request message, where the synchronization detection request message includes the ID of the first node. The first node may send, using a path used to transmit a clock synchronization signal, the synchronization detection request message to a node on the path used to transmit a clock synchronization signal. A node that receives the synchronization detection request message, for example, the second node, adds clock topology information of the node and the ID of the first node to a synchronization detection response message, and sends the synchronization detection response message to a node that initiates clock synchronization detection, for example, the first node. In this way, nodes included in the path used to transmit a clock synchronization signal all send, to the node that initiates clock synchronization detection, synchronization detection response messages that carry clock topology information of the node. The node that initiates clock synchronization detection may obtain a detection result of a clock synchronization path according to one or more received synchronization detection response messages. The node that initiates clock synchronization detection may determine, according to the detection result, a node with clock asynchronization and/or a node in which a fault exists, to help improve working efficiency of obtaining a status of the clock synchronization path.

DESCRIPTION OF EMBODIMENTS

Embodiments of the present application provide a method, node, and system for detecting a clock synchronization path. The method, node, and system for detecting a clock synchronization path may be applied to a mobile bearer network, for example, a bearer network such as a PTN or an IP RAN, or may be further applied to a scenario in which whether clock asynchronization exists between nodes is determined.

Figure 1:
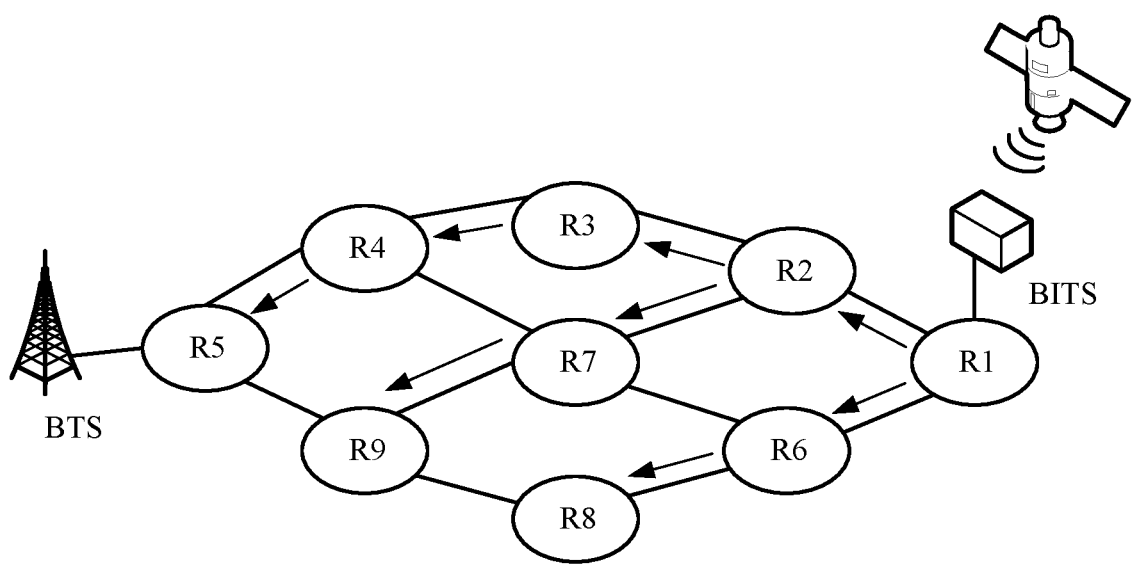
FIG. 1 is a schematic diagram of a scenario of a mobile bearer network.

As shown in FIG. 1, R1, R2, R3, R4, R5, R6, R7, R8 and R9 are network nodes in a mobile bearer network. The network nodes may include but are not limited to devices such as a transmission device, a radio network control device, a base station control device, and a radio core network device. The transmission device may be a device such as a switch, a router, or a PTN device. In FIG. 1, a BTS separately obtains a time synchronization signal and a frequency synchronization signal from R5 in two manners using a pulse per second (1PPS)+time of day (TOD) interface, that is, a 1PPS+TOD interface, and using an Ethernet interface. A BITS is an external clock source of a synchronization network in FIG. 1, and R1 also separately obtains a time synchronization signal and a frequency synchronization signal from the BITS in two manners using a 1PPS+TOD interface, and using an Ethernet interface. Generally, the BITS is disposed at a level-2 or level-3 node of a digital synchronization network, and provides timing signals for various devices that need clock synchronization. An interface between transmission bearer devices is an interface that transmits a SyncE packet and a 1588v2 packet. The interface varies with a bearer network or transport network. For a packet-based network, the interface may be an Ethernet interface. In an actual network scenario, a plurality of BITSs may be included. FIG. 1 shows only a network scenario in which one BITS and one BTS are included. A direction indicated by an arrow in FIG. 1 is a distribution direction of a clock synchronization signal that is in the network scenario shown in FIG. 1 and that is generated by the BITS serving as a clock source. The network scenario shown in FIG. 1 includes but is not limited to three clock synchronization paths, for example, a clock synchronization path from R1 to R5, where the clock synchronization path may be simply represented as R1→R2→R3→R4→R5, a clock synchronization path from R1 to R9, where the clock synchronization path may be simply represented as R1→R2→R7→R9, and a clock synchronization path from R1 to R8, where the clock synchronization path may be simply represented as R1→R6→R8. If a clock source of R10 (not shown in FIG. 1) in the mobile bearer network is from another BITS, a clock synchronization signal provided by the other BITS is different from the clock synchronization signal provided by the BITS in FIG. 1, and clock asynchronization exists when R10 is interconnected with R4. In a general method for locating a clock asynchronization problem, devices in a network are manually logged in to or accessed one by one to determine which device is a clock source of the device that is logged in to or accessed, and then determine a clock synchronization path to which the device belongs.

To resolve a general low-efficiency problem in obtaining a status of a clock synchronization path, an embodiment of the present application provides a method for detecting a clock synchronization path to help improve working efficiency of obtaining the status of the clock synchronization path.

The method for detecting a clock synchronization path according to an embodiment of the present application may be applied to the network scenario shown in FIG. 1. A method provided in Embodiment 1 of the present application is a path detection method in which a leaf node initiates detection and hop-by-hop detection is performed from the leaf node to a root node. A method provided in Embodiment 2 of the present application is a path detection method in which a root node initiates detection and hop-by-hop detection is performed from the root node to a leaf node. A method provided in Embodiment 3 of the present application is a path detection method in which a controller initiates detection and hop-by-hop detection is performed from a leaf node to a root node. A method provided in Embodiment 4 of the present application is a path detection method in which a controller initiates detection and hop-by-hop detection is performed from a root node to a leaf node. The root node may be a node that communicates with a BITS. The leaf node may be a node on a clock synchronization path other than the root node. A node that can communicate with a BTS is a leaf node. In the network scenario shown in FIG. 1, if R1 is a root node, R2 to R9 are leaf nodes, and meanings of the root node and the leaf node are based on a direction of clock synchronization distribution.

The following describes in detail the method for detecting a clock synchronization path according to the embodiments of the present application with reference to FIG. 2 to FIG. 5.

Figure 2:
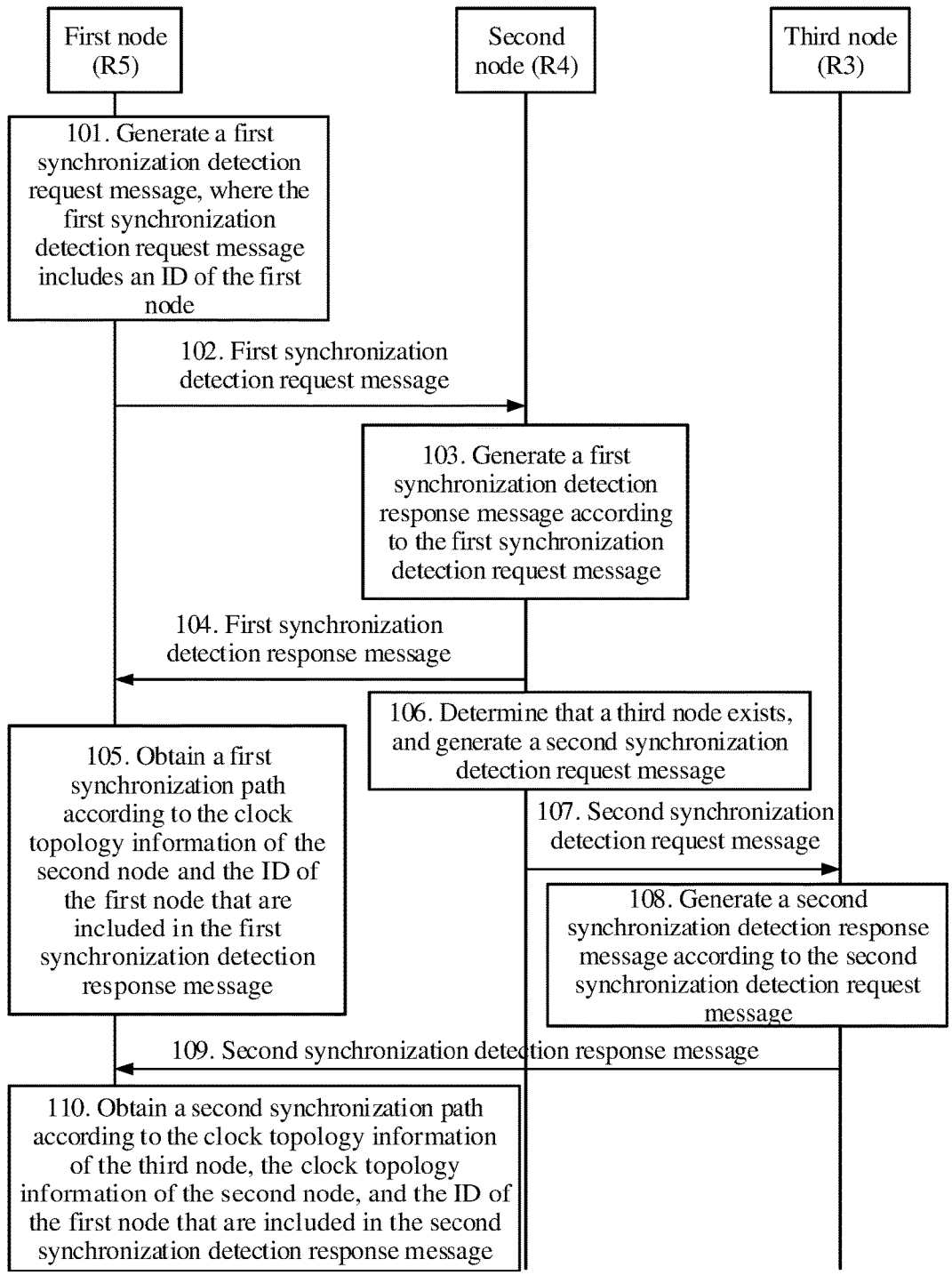
FIG. 2 is a schematic flowchart of a method for detecting a clock synchronization path according to Embodiment 1 of the present application.

FIG. 2 is a schematic flowchart of a method for detecting a clock synchronization path according to Embodiment 1 of the present application. As shown in FIG. 2, the method provided in Embodiment 1 of the present application may include content of the following step 101 to step 110.

Step 101. A first node generates a first synchronization detection request message, where the first synchronization detection request message includes an ID of the first node.

Further, the ID of the first node may be information that can uniquely identify the first node, for example, a sequence number, an index, or a character string. A specific expression form of the ID of the first node is not further separately illustrated herein. In Embodiment 1 of the present application, a second node may be used as a clock tracing node of the first node. The clock tracing node of the first node is a node that is configured to directly provide a clock synchronization signal for the first node. A clock source in this embodiment of the present application is a synchronization signal timing source. The synchronization signal timing source may be an external clock source or an internal clock source. For example, a clock source of a network node becomes faulty, the network node that obtains a synchronization signal from the clock source enters a free-run mode, and the network node becomes a new clock source.

For example, if the first node initiates detection of a clock synchronization path on which the first node is located, the first node needs to determine a neighboring node that has a clock synchronization relationship with the first node. The first node may determine, according to a port list of the first node, the neighboring node that has the clock synchronization relationship with the first node. The port list of the first node includes a port that is of the first node and that is used to receive a clock synchronization signal and N ports that are of the first node and that are used to send clock synchronization signals. N is an integer greater than or equal to 1. A port in the port list of the first node may be recorded in a form of a port ID. The port ID may be information that can uniquely identify the port, for example, a port name, or a port number. Examples are not given one by one herein for illustration. The clock synchronization signal is from the clock tracing node of the first node or the clock source. The clock tracing node of the first node is the node that is configured to directly provide a clock synchronization signal for the first node, and the port may be a physical port or a logical port, for example, a Precision Time Protocol (PTP) port, or a synchronous transport module (STM) STM-1 channel port at a rate of 155.520 megabits per second (Mbps). The PTP port includes a master port that is used to send a synchronization clock, a slave port that is used to receive a synchronization clock, and a passive port that neither sends nor receives a synchronization clock. The STM-1 channel port is used to transmit a synchronous digital hierarchy (SDH) signal.

For example, the first node may generate the first synchronization detection request message according to the ID of the first node. The first synchronization detection request message includes the ID of the first node.

Figures 5, 6:
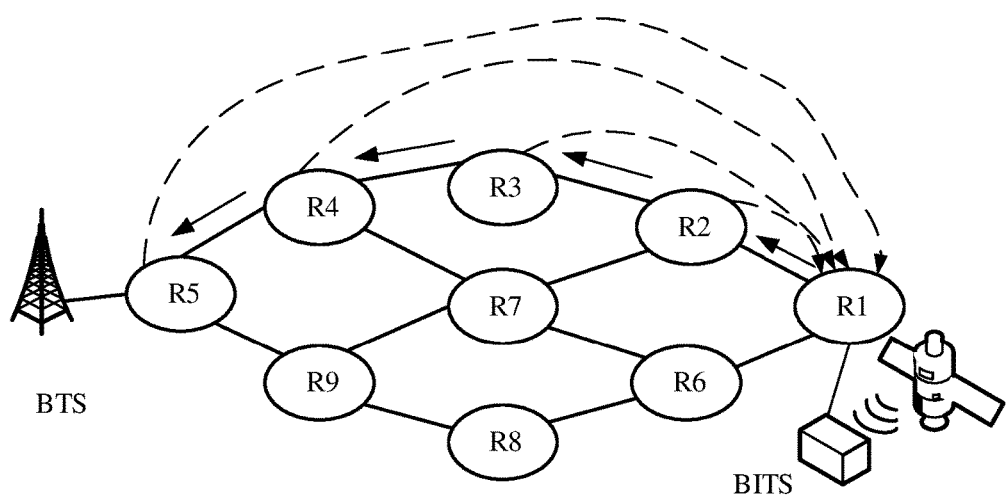
FIG. 5 is a schematic diagram of a network scenario according to Embodiment 2 of the present application.
FIG. 6 is a schematic diagram of a synchronization detection message format according to an embodiment of the present application.

Referring to FIG. 6, an embodiment of the present application provides a synchronization detection message format. It should be noted that the present application merely provides a possible and well-understood format, and sets no limitation on a specific format of a synchronization detection message. The synchronization detection message format shown in FIG. 6 is a Type-Length-Value (TLV) format, and the TLV format is a protocol-type and variable-encapsulation format. As shown in FIG. 6, a Req./Reply field is used to describe that a message that includes the field is a synchronization detection request message or a synchronization detection response message. A Sync Type field is used to indicate a clock synchronization type, that is, frequency synchronization or time synchronization. Generally, when the SyncE technology is used, the Sync Type field may indicate frequency synchronization. When IEEE 1588v2 is used, the Sync Type field indicates time synchronization. Certainly, content carried in the Sync Type field is used to determine the clock synchronization type. In an implementation, both the SyncE technology and IEEE 1588v2 may be used to implement time synchronization and frequency synchronization. A Sync Topology field is used to carry clock topology information. Content carried in the Sync Topology field may be determined according to the content of the Sync Type field. If the content of the Sync Type field indicates frequency synchronization, the clock topology information carried in the Sync Topology field includes a port list that is used to transmit a frequency synchronization signal. Optionally, the clock topology information carried in the Sync Topology field may further include an ID of a node. An ID of a port in the port list that is used to transmit a frequency synchronization signal may be one or more of a port name, a port number, a media access control (MAC) address of the port, or an IP address of the port. If the content of the Sync Type field indicates time synchronization, the clock topology information carried in the Sync Topology field includes a port list that is used to transmit a time synchronization signal. Optionally, the clock topology information carried in the Sync Topology field may further include an ID of a node. The port list that is used to transmit a time synchronization signal may be a list of all enabled PTP ports. A port in the PTP port list may include a port name, a port number, a state of a port (Slave, Master, and the like), a MAC address of the port, an IP address of the port, and the like. A Sync States field is used to indicate a clock state. Content of the Sync States field is different according to the content of the Sync Type field. If the Sync Type field indicates frequency synchronization, the content of the Sync States field is used to indicate one or more of a device lock state, clock source information, a clock source state, clock alarm information, or clock performance detection information. The clock source information may include one or more of a clock source priority, a clock source ID, or a clock source synchronization status message (SSM) level. The clock source SSM level includes primary reference clock (PRC), synchronization supply unit A (SSU-A), synchronization supply unit B (SSU-B), SDH equipment clock (SEC), and the like. The clock source state includes normal, port physical state Down, frequency offset exception, BITS clock source exception, and the like. The clock alarm information includes one or more of first alarm information or second alarm information.

For example, a synchronization detection message may be encapsulated in a label-switched path (LSP) Ping packet and used as a new forwarding equivalence class (FEC), or may be encapsulated in a Transmission Control Protocol (TCP) packet or used in a user datagram protocol (UDP) packet and used as a special application protocol, or may be encapsulated in a common Ethernet packet or IP packet in order to be applicable to various network synchronization scenarios that include a switch, a router, or a multiprotocol label switching (MPLS) device. A format of the synchronization detection message encapsulated in a specific protocol is not further illustrated herein. The first synchronization detection request message is one of synchronization detection request messages described when the Req./Reply field in the synchronization detection message format shown in FIG. 6 is a Req. field.

Figure 3:
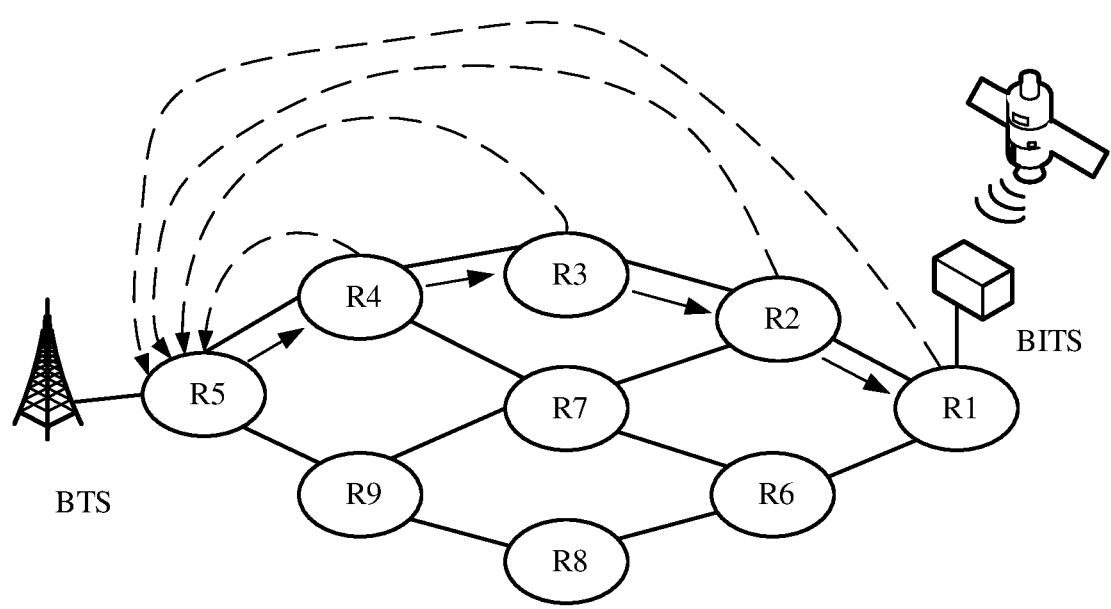
FIG. 3 is a schematic diagram of a network scenario according to Embodiment 1 of the present application.

With reference to a schematic diagram of a network scenario shown in FIG. 3, in this embodiment of the present application, a leaf node R5 initiates clock synchronization path detection to a root node R1. Therefore, the first node in this embodiment of the present application is R5 in FIG. 3. Optionally, before the first node generates the first synchronization detection request message, the first node may determine whether to initiate clock synchronization path detection. For example, before the first node generates the first synchronization detection request message, the method further includes the following. The first node determines whether the clock tracing node of the first node is traced, where the clock tracing node of the first node is the node that is configured to directly provide a clock synchronization signal for the first node, and after the first node determines that the clock tracing node of the first node is traced, the first node generates the first synchronization detection request. Further, the first node may determine, by checking that a device lock state is in a locked mode, that the clock tracing node of the first node is traced. In the scenario shown in FIG. 3, a clock tracing node of R5 is R4.

Optionally, before the first node generates the first synchronization detection request message, the method further includes the following. The first node determines whether the clock tracing node of the first node is lost, and after the first node determines that the clock tracing node of the first node is lost, the first node generates the first synchronization detection request message. Further, the first node may determine, by checking that a device lock state is in an unlocked mode, that the clock tracing node of the first node is lost.

Step 102. The first node sends the first synchronization detection request message to a second node.

Further, the first node sends the first synchronization detection request message using the port that is of the first node and that receives a clock synchronization signal. If the port that is of the first node and that receives a clock synchronization signal can communicate with the second node, that is, the second node is the clock tracing node of the first node, where a clock tracing node of the first node is a node that is configured to directly provide a clock synchronization signal for the first node, the first node sends the first synchronization detection request message to the second node using the port that is of the first node and that receives a clock synchronization signal. That is, R5 can send the first synchronization detection request message to R4 in FIG. 3 using a port that is of R5 and that receives a clock synchronization signal. Optionally, the first node may further obtain an IP address or a MAC address of a peer node of a physical connection of the first node using the port that is of the first node and that receives a clock synchronization signal, or obtain, using a locally cached data table of the first node, an IP address or a MAC address of the node that is used as the clock tracing node, or obtain, using a data table maintained by a Link Layer Discovery Protocol (LLDP), an IP address or a MAC address of the node that is used as the clock tracing node. In this embodiment, the second node is the clock tracing node of the first node, the clock tracing node of the first node is the node that is configured to directly provide a clock synchronization signal for the second node, and a port that is of the first node and that is used to transmit a clock synchronization signal is the port that is of the first node and that is used to receive a clock synchronization signal.

If a synchronization type in the first synchronization detection request message is a first synchronization type, where the first synchronization type is used to represent frequency synchronization, and the first synchronization detection request message is used to request to detect a frequency synchronization path, the first node determines, according to the first synchronization type in the first synchronization detection request message and the port used to transmit a clock synchronization signal, a port used to transmit a frequency synchronization signal. Then, the first node sends the first synchronization detection request message to the second node using the port used to transmit a frequency synchronization signal. In this embodiment, the port used to transmit a frequency synchronization signal is a port used to receive a frequency synchronization signal.

If a synchronization type in the first synchronization detection request message is a second synchronization type, where the second synchronization type is used to represent time synchronization, and the first synchronization detection request message is used to request to detect a time synchronization path, the first node determines, according to the second synchronization type in the first synchronization detection request message and the port used to transmit a clock synchronization signal, a port used to transmit a time synchronization signal. Then, the first node sends the first synchronization detection request message to the second node using the port used to transmit a time synchronization signal. In this embodiment, the port used to transmit a time synchronization signal is a port used to receive a time synchronization signal.

Step 103. The second node receives the first synchronization detection request message sent by the first node, and generates a first synchronization detection response message according to the first synchronization detection request message, where the first synchronization detection response message includes clock topology information of the second node and the ID of the first node.

Optionally, the second node receives the first synchronization detection request message sent by the first node, and determines whether a port that receives the first synchronization detection request message is a port used to transmit a clock synchronization signal. After the second node determines that the port that receives the first synchronization detection request message is the port used to transmit a clock synchronization signal, the second node may generate the first synchronization detection response message. In this embodiment, the port that is of the second node and that is used to transmit a clock synchronization signal is a port that is of the second node and that is used to send a clock synchronization signal.

For example, after receiving the first synchronization detection request message, the second node obtains the ID of the first node from the first synchronization detection request message. The second node generates the first synchronization detection response message according to the clock topology information of the second node and the ID of the first node. Optionally, in the first synchronization detection response message, the clock topology information of the second node may be added to a location after that of the ID of the first node.

For example, the clock topology information of the second node includes an ID of the second node and a port list of the second node. The port list of the second node includes a port that is of the second node and that is used to receive a clock synchronization signal and M ports that are of the second node and that are used to send clock synchronization signals. M is an integer greater than or equal to 1.

For example, if the port that is of the second node and that is used to transmit a clock synchronization signal is a port that is of the second node and that is used to transmit a frequency synchronization signal, the second node adds the first synchronization type to the first synchronization detection response message. The port that is of the second node and that is used to transmit a frequency synchronization signal is a port that is of the second node and that is used to send a frequency synchronization signal. If the port that is of the second node and that is used to transmit a clock synchronization signal is a port that is of the second node and that is used to transmit a time synchronization signal, the second node adds the second synchronization type to the first synchronization detection response message. The port that is of the second node and that is used to transmit a time synchronization signal is a port that is of the second node and that is used to send a time synchronization signal.

Step 104. The second node sends the first synchronization detection response message to the first node.

For example, a node that initiates clock synchronization detection adds, to a synchronization detection request message sent to the second node, an ID of the node that initiates clock synchronization detection. The second node sends the first synchronization detection response message to the node that initiates clock synchronization detection.

In an implementation, the first node is the node that initiates clock synchronization detection, and the first synchronization detection request message includes the ID of the first node. That the second node sends the first synchronization detection response message to the node that initiates clock synchronization detection includes the following. The second node may send the first synchronization detection response message to the first node according to the ID of the first node.

In another implementation, if the first node is not the node that initiates clock synchronization detection, and a fourth node is the node that initiates clock synchronization detection, the first synchronization detection request message includes an ID of the fourth node, and the first synchronization detection response message includes the ID of the fourth node. That the second node sends the first synchronization detection response message to the node that initiates clock synchronization detection includes the following. The second node sends the first synchronization detection response message to the fourth node according to the ID of the fourth node that is included in the first synchronization detection request message.

Step 105. The first node receives the first synchronization detection response message sent by the second node, and obtains a first synchronization path according to the clock topology information of the second node and the ID of the first node that are included in the first synchronization detection response message, where the first synchronization path is a clock synchronization path between the first node and the second node.

As shown in FIG. 3, R5 may obtain an ID of R5 and clock topology information of R4 from the first synchronization detection response message. The clock topology information of R4 includes an ID of R4 and a clock port list of R4. The clock port list of R4 includes a port that is of R4 and that is used to receive a clock synchronization signal and a port that is of R4 and that is used to send a clock synchronization signal. R5 may determine that the first synchronization path is R4→R5 according to the ID of R4 and the ID of R5. The second node is the clock tracing node of the first node, where the clock tracing node of the first node is the node that is configured to directly provide a clock synchronization signal for the first node, that is, R4 is the clock tracing node of R5.

In this embodiment, the second node is not the last node on the clock synchronization path, that is, the second node has the port that receives a clock synchronization signal, and the second node is not a node that is directly connected to a BITS. Therefore, the method for detecting a clock synchronization path according to this embodiment further includes content of step 106 to step 110.

Step 106. The second node determines that a third node exists, and generates a second synchronization detection request message, where the third node is a node that can transmit a frequency synchronization signal to the second node, and the second synchronization detection request message includes clock topology information of the first node and the clock topology information of the second node.

For example, that the second node determines that a third node exists includes the following. The second node determines, according to the port list of the second node, that the second node has the port that receives a clock synchronization signal, and the second node is not the node that is connected to the BITS. In other words, the port that is of the second node and that receives a clock synchronization signal can communicate with the third node. A method for determining the third node by the second node is the same as the method for determining the second node by the first node in step 102. Details are not repeatedly described herein. The third node corresponds to R3 in FIG. 3.

For example, the second node generates the second synchronization detection request message according to the first synchronization detection request message and the clock topology information of the second node. In an implementation, the second node may add the ID of the second node to the first synchronization detection request message to generate the second synchronization detection request message. In another implementation, the second node may add the ID of the second node and the clock port list of the second node to the first synchronization detection request message to generate the second synchronization detection request message. In this embodiment, the third node is a clock tracing node of the second node. The clock tracing node of the second node is a node that is configured to directly provide a clock synchronization signal for the second node.

Step 107. The second node sends the second synchronization detection request message to the third node.

For example, the second node sends the second synchronization detection request message to the third node using a port used to transmit a clock synchronization signal. The port used to transmit a clock synchronization signal is a port that is on the second node and that can transmit a frequency synchronization signal to the third node, that is, the port that is on the second node and that receives a clock synchronization signal.

If a synchronization type in the second synchronization detection request message is the first synchronization type, the second node determines, according to the first synchronization type in the second synchronization detection request message and the port used to transmit a clock synchronization signal, a port used to transmit a frequency synchronization signal. Then, the second node sends the second synchronization detection request message to the third node using the port used to transmit a frequency synchronization signal. The port that is of the second node and that is used to transmit a frequency synchronization signal is a port that is of the second node and that is used to receive a frequency synchronization signal.

If a synchronization type in the second synchronization detection request message is the second synchronization type, the second node determines, according to the second synchronization type in the second synchronization detection request message and the port used to transmit a clock synchronization signal, a port used to transmit a time synchronization signal. Then, the second node sends the second synchronization detection request message to the third node using the port used to transmit a time synchronization signal. The port that is of the second node and that is used to transmit a time synchronization signal is a port that is of the second node and that is used to receive a time synchronization signal.

Step 108. The third node receives the second synchronization detection request message sent by the second node, and generates a second synchronization detection response message according to the second synchronization detection request message, where the second synchronization detection response message includes clock topology information of the third node, the clock topology information of the second node, and the ID of the first node.

Optionally, the third node receives the second synchronization detection request message sent by the second node, and determines whether a port that receives the second synchronization detection request message is a port used to transmit a clock synchronization signal. After the third node determines that the port that receives the second synchronization detection request message is the port used to transmit a clock synchronization signal, the third node may generate the second synchronization detection response message. In this embodiment, the port that is of the third node and that is used to transmit a clock synchronization signal is a port that is of the third node and that is used to send a clock synchronization signal.

For example, after receiving the second synchronization detection request message, the third node obtains the clock topology information of the second node and the ID of the first node from the second synchronization detection request message. The third node generates the second synchronization detection response message according to the clock topology information of the third node, the clock topology information of the second node, and the ID of the first node. Optionally, in the second synchronization detection response message, the clock topology information of the third node may be added to a location after that of the clock topology information of the second node. That is, in the second synchronization detection response message, the clock topology information of the third node is located after the location of the clock topology information of the second node, and the clock topology information of the second node is located after the location of the ID of the first node.

For example, the clock topology information of the third node includes an ID of the third node and a port list of the third node. The port list of the third node includes a port that is of the third node and that is used to receive a clock synchronization signal and L ports that are of the third node and that are used to send clock synchronization signals. L is an integer greater than or equal to 1.

For example, if the port that is of the third node and that is used to transmit a clock synchronization signal is a port that is of the third node and that is used to transmit a frequency synchronization signal, the third node adds the first synchronization type to the second synchronization detection response message. The port that is of the third node and that is used to transmit a frequency synchronization signal is a port that is of the third node and that is used to send a frequency synchronization signal. If the port that is of the third node and that is used to transmit a clock synchronization signal is a port that is of the third node and that is used to transmit a time synchronization signal, the third node adds the second synchronization type to the second synchronization detection response message. The port that is of the third node and that is used to transmit a time synchronization signal is a port that is of the third node and that is used to send a time synchronization signal.

Step 109. The third node sends the second synchronization detection response message to the first node.

For example, the node that initiates clock synchronization detection adds, to a synchronization detection request message sent to the third node, the ID of the node that initiates clock synchronization detection. The third node sends the second synchronization detection response message to the node that initiates clock synchronization detection.

In an implementation, the first node is the node that initiates clock synchronization detection, and the second synchronization detection request message includes the ID of the first node. That the third node sends the second synchronization detection response message to the node that initiates clock synchronization detection includes the following. The third node may send the second synchronization detection response message to the first node according to the ID of the first node.

In another implementation, if the first node is not the node that initiates clock synchronization detection, and the fourth node is the node that initiates clock synchronization detection, the second synchronization detection request message includes the ID of the fourth node, and the second synchronization detection response message includes the ID of the fourth node. That the third node sends the second synchronization detection response message to the node that initiates clock synchronization detection includes the following. The third node sends the second synchronization detection response message to the fourth node according to the ID of the fourth node that is included in the second synchronization detection request message.

Step 110. The first node receives the second synchronization detection response message sent by the third node, and obtains a second synchronization path according to the clock topology information of the third node, the clock topology information of the second node, and the ID of the first node that are included in the second synchronization detection response message, where the second synchronization path is a clock synchronization path between the first node and the third node, and the second synchronization path passes through the second node.

As shown in FIG. 3, R5 may obtain the ID of R5, the clock topology information of R4, and clock topology information of R3 from the second synchronization detection response message. The clock topology information of R4 includes the ID of R4 and the clock port list of R4. The clock port list of R4 includes the port that is of R4 and that is used to receive a clock synchronization signal and the port that is of R4 and that is used to send a clock synchronization signal. The clock topology information of R3 includes an ID of R3 and a clock port list of R3. The clock port list of R3 includes a port that is of R3 and that is used to receive a clock synchronization signal and a port that is of R3 and that is used to send a clock synchronization signal. R5 may determine that the second synchronization path is R3→R4→R5 according to the ID of R4 and the ID of R3. The third node is the clock tracing node of the second node, and the clock tracing node of the second node is the node that is configured to directly provide a clock synchronization signal for the second node. That is, R3 is a clock tracing node of R4. The second node is the clock tracing node of the first node, and the clock tracing node of the first node is the node that is configured to directly provide a clock synchronization signal for the first node. That is, R4 is the clock tracing node of R5.

With reference to the schematic diagram of the network scenario shown in FIG. 3, a solid line arrow is a direction of sending a synchronization detection request message, and a dashed line arrow is a direction of sending a synchronization detection response message. It can be learned from FIG. 3 that, on a clock synchronization path of R1→R2→R3→R4→R5, R5 initiates clock synchronization path detection, and synchronization detection response messages generated by R1, R2, R3, and R4 are sent to R5. As shown in FIG. 3, a dashed line arrow from R4 to R5 is the first synchronization detection response message in FIG. 2, a dashed line arrow from R3 to R5 is the second synchronization detection response message in FIG. 2, a solid line arrow from R5 to R4 is the first synchronization detection request message in FIG. 2, and a solid line arrow from R4 to R3 is the second synchronization detection request message in FIG. 2. If R5 can receive the synchronization detection response messages sent by R4, R3, R2, and R1, R5 can obtain the complete clock synchronization path according to these synchronization detection response messages, and the complete clock synchronization path may be represented as R1→R2→R3→R4→R5.

If a link fault or a physical port synchronization fault exists on the clock synchronization path of R1→R2→R3→R4→R5, R5 can obtain a part of the clock synchronization path. For example, if R5 can receive only the synchronization detection response messages sent by R4 and R3, it may be deduced that a link fault or a physical port synchronization fault exists between R3 and R2. Further, according to the clock synchronization path obtained by R5, an administrator may be prompted to detect a physical link or port in which a fault occurs.

In the method provided in this embodiment of the present application, the first node may use the first synchronization path as a first detection result, and the first detection result is used to indicate a status of the clock synchronization path between the first node and the second node. That is, a process in which the first node obtains the first synchronization path is a process in which the first node obtains the first detection result.

In this embodiment of the present application, the first node generates the first synchronization detection request message, and sends the first synchronization detection request message to the second node. The second node feeds back the first synchronization detection response message to the first node according to the first synchronization detection request message. The first node obtains the first synchronization path according to the first synchronization detection response message. By analogy, the first node can efficiently obtain the clock synchronization path, and this helps determine a node with clock asynchronization according to the clock synchronization path.

Based on the method provided in Embodiment 1 of the present application, another embodiment of the present application provides a method for locating a fault on a clock synchronization path. The method for locating a fault on a clock synchronization path according to the other embodiment of the present application is described with reference to FIG. 2 and FIG. 3. In the following description, content same as that provided in Embodiment 1 is not repeatedly described, and only content different from the method provided in Embodiment 1 is described.

Optionally, before step 103, the method further includes the following. The second node obtains first alarm information after detecting that a physical layer fault exists in the second node. The first alarm information is used to indicate that a physical layer fault exists in the node that sends the first synchronization detection response message. In step 103, that the second node generates a first synchronization detection response message according to the first synchronization detection request message further includes the following. The second node adds the first alarm information to the first synchronization detection response message. If the first synchronization detection response message includes the first synchronization type, the first alarm information further includes an indication value of a specific alarm type such as a synchronization processing hardware fault and a frequency output module fault. The frequency output module fault includes TR_LOC, HEAD_ERR, HEAD_BAD, BUS_ERR, and the like. If the first synchronization detection response message includes the second synchronization type, the first alarm information further includes an indication value of a specific alarm type such as a synchronization processing hardware fault and a PTP physical link alarm. The PTP physical link alarm includes ETH_LOS, ETH_LINK_DOWN, and the like.

Optionally, before, after or at the same time as step 105, the method further includes the following. The first node obtains a first alarm message according to the first synchronization detection response message, where the first alarm message is used to advertise that a physical layer fault exists in the node. The first alarm message includes the ID of the second node. The ID of the second node may be from the clock topology information of the second node. In this embodiment, the first detection result obtained by the first node includes a first synchronization path and the first alarm message. The first synchronization path obtained by the first node is the same as the first synchronization path in Embodiment 1. Details are not repeatedly described herein.

For example, that the first node obtains a first alarm message according to the first synchronization detection response message includes the following. The first node determines, according to the first alarm information included in the first synchronization detection response message, that a physical layer fault exists in the second node, and the first node generates the first alarm message according to the ID of the second node that is included in the first synchronization detection response message, where the first alarm message includes the ID of the second node.

In the network scenario shown in FIG. 3, R5 may first detect whether a physical layer fault exists in the local node. If a physical layer fault exists in the local node, R5 outputs a first alarm message that is used to advertise that a physical layer fault exists in R5. If synchronization detection response messages received by R5 include a plurality of synchronization detection response messages that carry first alarm information, R5 may output first alarm messages according to a sequence of nodes on a clock synchronization path. For example, if physical layer faults exist in both R4 and R3, R5 may first output a first alarm message that is used to advertise that a physical layer fault exists in R3. Then, R5 may output, after the physical layer fault in R3 is rectified, a first alarm message that is used to advertise that a physical layer fault exists in R4.

Based on the method provided in Embodiment 1 or the method provided in the other embodiment, still another embodiment of the present application provides another method that may be used to locate a fault. In the following description, content same as that provided in the foregoing embodiments is not repeatedly described, and only content different from the methods provided in the foregoing embodiments is described.

Optionally, before step 103, the method further includes the following. The second node obtains a second alarm information after detecting that a clock source of the second node is abnormal. The second alarm information is used to indicate that the node sending the first synchronization detection response message detects that the clock source of the node is abnormal. In step 103, that the second node generates a first synchronization detection response message according to the first synchronization detection request message further includes the following. The second node adds the second alarm information to the first synchronization detection response message. If the first synchronization detection response message includes the first synchronization type, the second alarm information includes an indication value of a specific exception type, for example, a frequency input reference source loss such as SYNC_C_LOS, EXT_SYNC_LOS, and LTI, clock loss of lock such as CLK_LOCK_FAIL, an ESMC packet loss such as SSM_PKT_LOS, current reference source FREQ threshold crossing such as SYN_BAD, and frequency input reference source SSM level degradation such as S1_SYN_CHANGE. If the first synchronization detection response message includes the second synchronization type, the second alarm information includes an indication value of a specific exception type, for example, a 1PPS+TOD input loss such as EXT_TIME_LOC, time loss of lock such as TIME_LOCK_FAIL, PTP input degradation such as PTPSRC_CLKCLS_DEC, an Announce packet loss such as PTP_PKT_LOS, and a Sync or Delay_Resp packet loss.

Optionally, before, after or at the same time as step 105, the method further includes the following. The first node obtains a second alarm message according to the first synchronization detection response message, where the second alarm message is used to advertise that the clock source of the second node is abnormal, and the second alarm message includes the ID of the second node. The ID of the second node may be from the clock topology information of the second node. In this embodiment, the first detection result obtained by the first node includes a first synchronization path and the second alarm message. The first synchronization path obtained by the first node is the same as the first synchronization path in Embodiment 1. Details are not repeatedly described herein. Optionally, the first detection result obtained by the first node may further include the first alarm message in the foregoing embodiment.

For example, that the first node obtains a second alarm message according to the first synchronization detection response message includes the following. The first node determines, according to the second alarm information included in the first synchronization detection response message, that the clock source of the second node is abnormal, and the first node generates the second alarm message according to the ID of the second node that is included in the first synchronization detection response message, where the second alarm message includes the ID of the second node.

In the network scenario shown in FIG. 3, if a plurality of synchronization detection response messages received by R5, such as synchronization detection response messages sent by R4, R3, and R2, do not include the first alarm message but include the second alarm message, and R1 sends neither the first alarm message nor the second alarm message, R5 may first output a second alarm message that is used to advertise that a clock source of R2 is abnormal. Then, R5 may detect, after a clock source exception of R2 is rectified, whether faults in R3 and R4 are rectified. When a fault in R3 or R4 is not rectified, R5 outputs a second alarm message that is used to advertise that a clock source is abnormal. Examples are not given one by one herein for illustration.

In this embodiment of the present application, by detecting whether a synchronization detection response message fed back by another node other than the first node includes the first alarm message or the second alarm message, a node in which a fault exists or a node indicated by an alarm on a clock synchronization path of the first node is obtained by means of analysis such that fault detection is implemented, and an administrator can conveniently process the alarm or the fault in a timely manner.

Based on the methods provided in the foregoing embodiments, yet another embodiment of the present application provides another method that may be used to determine performance degradation. In the following description, content same as that provided in the foregoing embodiments is not repeatedly described, and only content different from the methods provided in the foregoing embodiments is described.

Optionally, before step 103, the method further includes the following. The second node obtains performance monitoring information after detecting that frequency offset performance of the second node degrades. The performance monitoring information is used to indicate the frequency offset performance of the node that sends the first synchronization detection response message. In step 103, that the second node generates a first synchronization detection response message according to the first synchronization detection request message further includes the following. The first node determines, according to the performance monitoring information included in the first synchronization detection response message, that the frequency offset performance of the second node degrades, and the first node generates the performance exception message according to the ID of the second node that is included in the first synchronization detection response message, where the performance exception message includes the ID of the second node.

Optionally, before, after or at the same time as step 105, the method further includes the following. The first node obtains the performance exception message according to the first synchronization detection response message, where the performance exception message is used to advertise that frequency offset performance of the node degrades, and the performance exception message includes the ID of the second node. The ID of the second node may be from the clock topology information of the second node. In this embodiment, the first detection result obtained by the first node includes a first synchronization path and the performance exception message. The first synchronization path obtained by the first node is the same as the first synchronization path in Embodiment 1. Details are not repeatedly described herein.

For example, that the first node obtains the performance exception message according to the first synchronization detection response message further includes The first node determines, according to the performance monitoring information included in the first synchronization detection response message, that the frequency offset performance of the second node degrades, and the first node generates the performance exception message according to the ID of the second node that is included in the first synchronization detection response message, where the performance exception message includes the ID of the second node.

In the network scenario shown in FIG. 3, if frequency offset performance of R5 degrades, but an alarm has not been generated, R5 analyzes received synchronization detection response messages one by one. If synchronization detection response messages from R4 and R3 include performance monitoring information that indicates frequency offset performance degradation, and synchronization detection response messages from R2 and R1 do not include performance monitoring information that indicates frequency offset performance degradation, R5 outputs a performance exception message that is used to advertise that frequency offset performance of R3 degrades. After the frequency offset performance of R3 is recovered to normal, R5 performs monitoring again and determines whether frequency offset performance of R4 and that of R5 are normal. If the frequency offset performance of R4 and that of R5 are normal, a problem of frequency offset performance degradation is resolved. Otherwise, R5 resolves the problem of frequency offset performance degradation hop-by-hop with reference to a manner of rectifying the frequency offset performance degradation of R3.

In this embodiment of the present application, by detecting whether a frequency offset performance degradation exception exists in a synchronization detection response message fed back by another node other than the first node, a node whose performance is abnormal on a clock synchronization path of the first node is obtained by means of analysis such that performance detection of a node on the clock synchronization path is implemented, and an administrator can conveniently process a performance exception in a timely manner.

The plurality of embodiments for locating a fault and the embodiment for determining performance degradation above may be used as independent embodiments. If the plurality of embodiments for locating a fault and the embodiment for determining performance degradation above are used as independent embodiments, the plurality of embodiments do not include steps for obtaining the first synchronization path such as step 105 and step 110 in Embodiment 1. Correspondingly, the content added in the plurality of embodiments for locating a fault and the embodiment for determining performance degradation needs to be added to the plurality of embodiments.

Figure 4A:
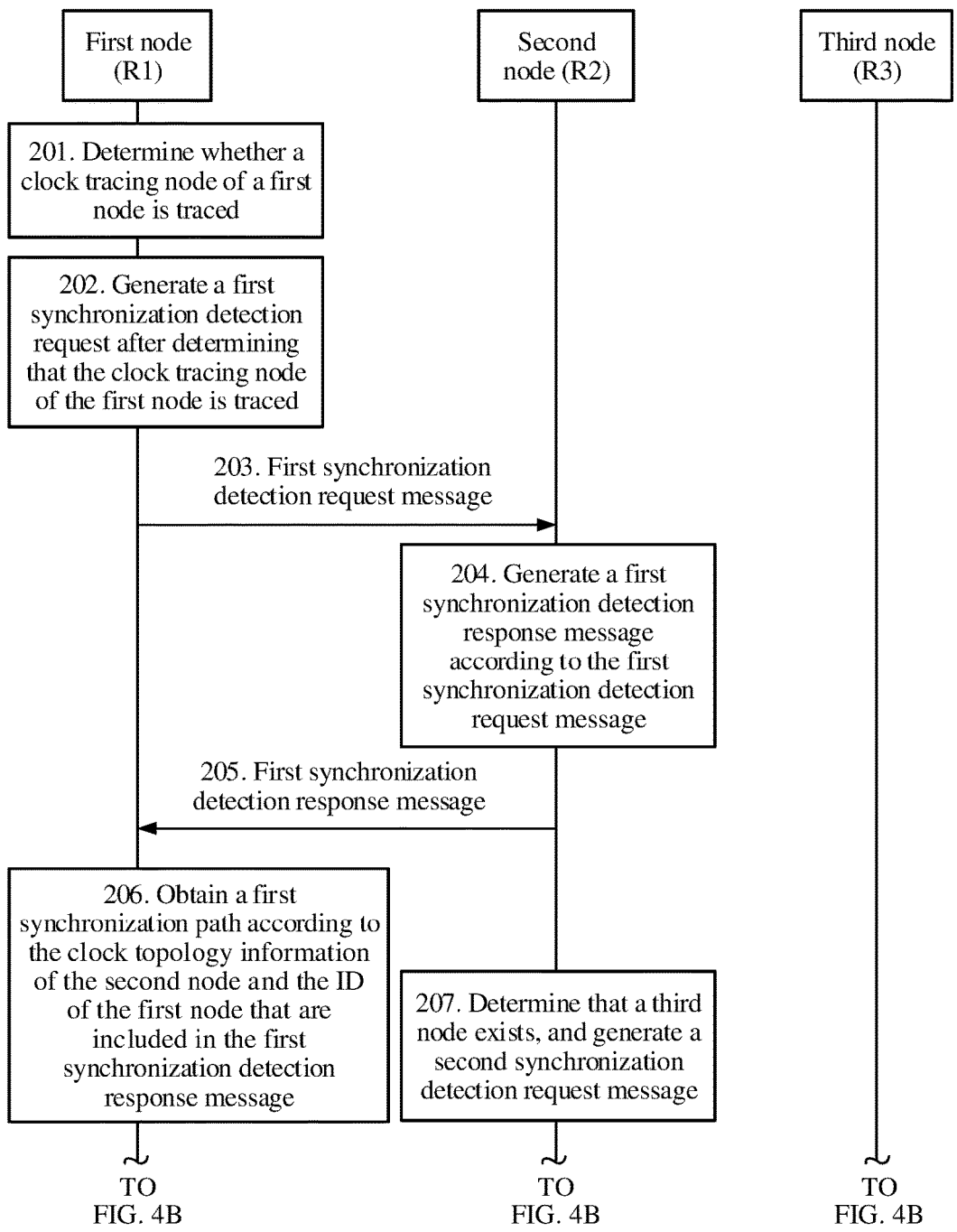
FIG. 4A and FIG. 4B are a schematic flowchart of a method for detecting a clock synchronization path according to Embodiment 2 of the present application.
Figure 4B:
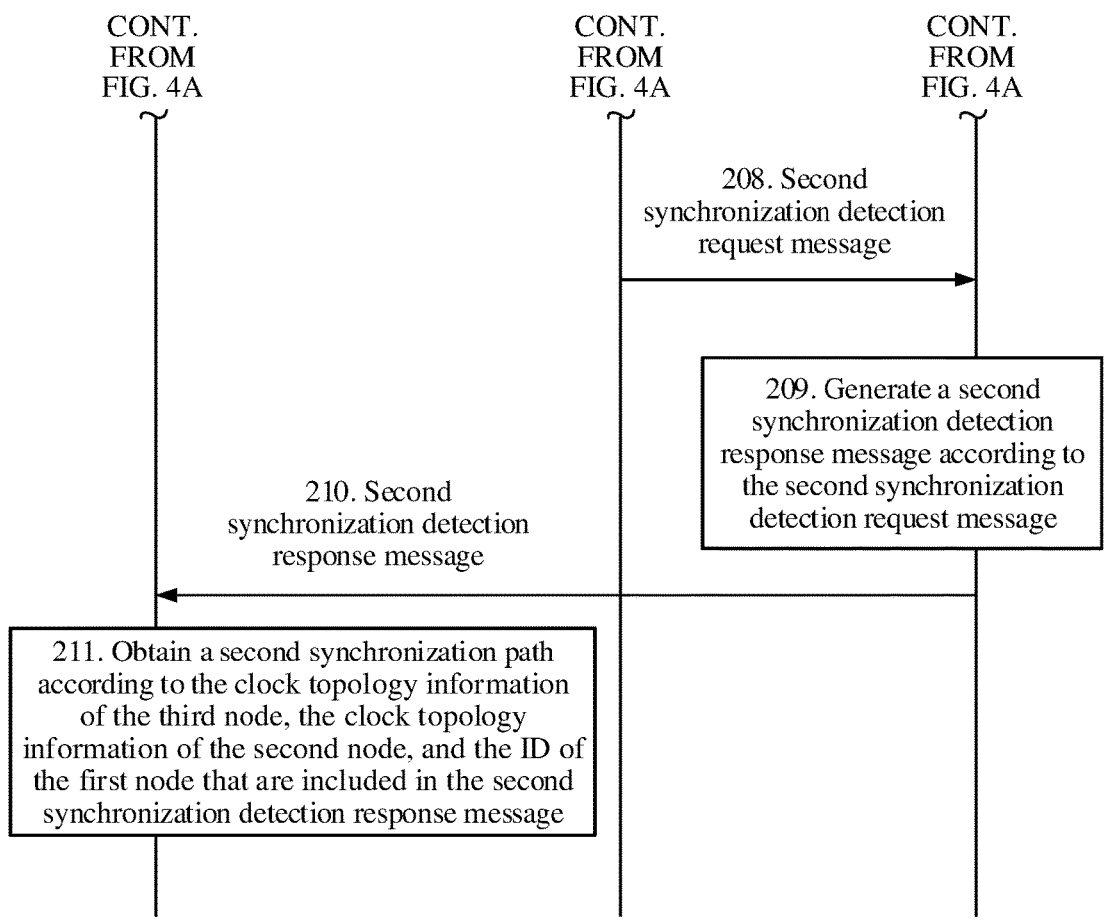

FIG. 4A and FIG. 4B are a schematic flowchart of a method for detecting a clock synchronization path according to Embodiment 2 of the present application. As shown in FIG. 4A and FIG. 4B, the method provided in Embodiment 2 of the present application may include content of the following step 201 to step 211.

Step 201. A first node determines whether a clock tracing node of the first node is traced.

With reference to a network scenario shown in FIG. 5, in this embodiment of the present application, a root node R1 initiates clock synchronization path detection to a leaf node. Therefore, the first node in this embodiment of the present application is R1 in FIG. 5. Before the first node generates the first synchronization detection request message, the first node needs to determine whether to initiate clock synchronization path detection.

For example, the first node determines, by determining whether the clock tracing node of the first node is traced, whether to initiate clock synchronization path detection. The clock tracing node of the first node is a node that is configured to directly provide a clock synchronization signal for the first node. Further, the first node may determine, by checking that a device lock state is locked, that the clock tracing node of the first node is traced. Optionally, the first node determines, according to a port that is of the first node and that is used to receive a clock synchronization signal, whether the clock tracing node of the first node is traced. If the port that is of the first node and that is used to receive a clock synchronization signal is connected to a BITS, it is determined that the first node traces the BITS.

After determining that the clock tracing node of the first node is traced, the first node performs step 202 to generate a first synchronization detection request. In FIG. 5, a clock source of R1 is a BITS, and the first node may be used as a clock tracing node of a second node, and provides a clock synchronization signal for the second node. The clock tracing node of the second node is a node that is configured to directly provide a clock synchronization signal for the second node.

Step 202. The first node generates a first synchronization detection request message after determining that the clock tracing node of the first node is traced, where the first synchronization detection request message includes an ID of the first node.

Further, for a specific description of the ID of the first node, refer to the description of the ID of the first node in Embodiment 1 of the present application. Details are not repeatedly described herein. Optionally, the first synchronization detection request message further includes a port list of the first node. The port list of the first node includes the port that is of the first node and that is used to receive a clock synchronization signal and N ports that are of the first node and that are used to send clock synchronization signals. N is an integer greater than or equal to 1. A port in the port list of the first node may be recorded in a form of a port ID. The port ID may be information that can uniquely identify the port, for example, a port name, or a port number. Examples are not given one by one herein for illustration. The port may be a physical port or a logical port. Different from Embodiment 1, the clock synchronization signal is from the BITS in FIG. 5.

For a format of the first synchronization detection request message, refer to the specific description provided with reference to FIG. 6 in Embodiment 1. Details are not repeatedly described herein.

Step 203. The first node sends the first synchronization detection request message to a second node.

Further, the first node sends the first synchronization detection request message using a port that is of the first node and that sends a clock synchronization signal. If the port that is of the first node and that sends a clock synchronization signal can communicate with the second node, that is, the first node is the clock tracing node of the second node, the first node can send the first synchronization detection request message to the second node using the port that is of the first node and that sends a clock synchronization signal. That is, R1 can send the first synchronization detection request message to R2 in FIG. 5 using a port that sends a clock synchronization signal. In this embodiment, because the first node is the clock tracing node of the second node, a port that is of the first node and that is used to transmit a clock synchronization signal is the port that is of the first node and that is used to send a clock synchronization signal.

If a synchronization type in the first synchronization detection request message is a first synchronization type, where the first synchronization type is used to represent frequency synchronization, and the first synchronization detection request message is used to request to detect a frequency synchronization path, the first node determines, according to the first synchronization type in the first synchronization detection request message and the port used to transmit a clock synchronization signal, a port used to transmit a frequency synchronization signal. Then, the first node sends the first synchronization detection request message to the second node using the port used to transmit a frequency synchronization signal. In this embodiment, the port used to transmit a frequency synchronization signal is a port used to send a frequency synchronization signal.

If a synchronization type in the first synchronization detection request message is a second synchronization type, where the second synchronization type is used to represent time synchronization, and the first synchronization detection request message is used to request to detect a time synchronization path, the first node determines, according to the second synchronization type in the first synchronization detection request message and the port used to transmit a clock synchronization signal, a port used to transmit a time synchronization signal. Then, the first node sends the first synchronization detection request message to the second node using the port used to transmit a time synchronization signal. In this embodiment, the port used to transmit a time synchronization signal is a port used to send a time synchronization signal.

Step 204. The second node receives the first synchronization detection request message sent by the first node, and generates a first synchronization detection response message according to the first synchronization detection request message, where the first synchronization detection response message includes clock topology information of the second node and the ID of the first node.

Step 205. The second node sends the first synchronization detection response message to the first node.

For specific implementation processes of step 204 and step 205 in Embodiment 2 of the present application, refer to the specific descriptions of step 103 and step 104 in Embodiment 1. Details are not repeatedly described herein.

Step 206. The first node receives the first synchronization detection response message sent by the second node, and obtains a first synchronization path according to the clock topology information of the second node and the ID of the first node that are included in the first synchronization detection response message, where the first synchronization path is a clock synchronization path between the first node and the second node.

As shown in FIG. 5, R1 may obtain an ID of R1 and clock topology information of R2 from the first synchronization detection response message. The clock topology information of R2 includes an ID of R2 and a clock port list of R2. The clock port list of R2 includes a port that is of R2 and that is used to receive a clock synchronization signal and a port that is of R2 and that is used to send a clock synchronization signal. R1 may determine that the first synchronization path is R1→R2 according to the ID of R1 and the ID of R2. The first node is the clock tracing node of the second node, that is, R1 is a clock tracing node of R2.

In this embodiment, the second node is not the last node on the clock synchronization path, that is, the second node has a port that sends a clock synchronization signal, and the second node is not a node that is connected to a BTS. Therefore, the method for detecting a clock synchronization path according to this embodiment further includes content of step 206 to step 210.

Step 207. The second node determines that a third node exists, and generates a second synchronization detection request message, where the third node is a node that can transmit a frequency synchronization signal to the second node, and the second synchronization detection request message includes the ID of the first node and the clock topology information of the second node.

For example, that the second node determines that a third node exists includes the following. The second node determines, according to a port list of the second node, that the second node has the port that sends a clock synchronization signal, and the second node is not the node that is connected to the BTS. In other words, the port that is of the second node and that sends a clock synchronization signal can communicate with the third node. A method for determining the third node by the second node is the same as the method for determining the second node by the first node in step 202. Details are not repeatedly described herein. The third node corresponds to R3 in FIG. 5.

For example, the second node generates the second synchronization detection request message according to the first synchronization detection request message and the clock topology information of the second node. Further, the second node may add an ID of the second node and the clock port list of the second node to the first synchronization detection request message, to generate the second synchronization detection request message. In this embodiment, the second node is a clock tracing node of the third node. The clock tracing node of the third node is a node that is configured to directly provide a clock synchronization signal for the third node.

Step 208. The second node sends the second synchronization detection request message to the third node.

A difference between step 208 in Embodiment 2 of the present application and step 107 in Embodiment 1 lies in that, a port used to transmit a clock synchronization signal is a port that is on the second node and that can transmit a frequency synchronization signal to the third node, that is, the port that is on the second node and that sends a clock synchronization signal, a port that is of the second node and that is used to transmit a frequency synchronization signal is a port that is of the second node and that is used to send a frequency synchronization signal, and a port that is of the second node and that is used to transmit a time synchronization signal is a port that is of the second node and that is used to send a time synchronization signal. For other content of sending the second synchronization detection request message to the third node by the second node, refer to the specific description of step 107 in Embodiment 1. Details are not repeatedly described herein.

Step 209. The third node receives the second synchronization detection request message sent by the second node, and generates a second synchronization detection response message according to the second synchronization detection request message, where the second synchronization detection response message includes clock topology information of the third node, the clock topology information of the second node, and the ID of the first node.

Step 210. The third node sends the second synchronization detection response message to the first node.

For specific implementations of step 209 and step 210 in Embodiment 2 of the present application, refer to the specific descriptions of step 108 and step 109 in Embodiment 1. Details are not repeatedly described herein.

Step 211. The first node receives the second synchronization detection response message sent by the third node, and obtains a second synchronization path according to the clock topology information of the third node, the clock topology information of the second node, and the ID of the first node that are included in the second synchronization detection response message, where the second synchronization path is a clock synchronization path between the first node and the third node, and the second synchronization path passes through the second node.

As shown in FIG. 5, R1 may obtain the ID of R1, the clock topology information of R2, and clock topology information of R3 from the second synchronization detection response message. The clock topology information of R2 includes the ID of R2 and the clock port list of R2. The clock port list of R2 includes the port that is of R2 and that is used to receive a clock synchronization signal and the port that is of R2 and that is used to send a clock synchronization signal. The clock topology information of R3 includes an ID of R3 and a clock port list of R3. The clock port list of R3 includes a port that is of R3 and that is used to receive a clock synchronization signal and a port that is of R3 and that is used to send a clock synchronization signal. R1 may determine that the second synchronization path is R1→R2→R3 according to the ID of R2 and the ID of R3. The second node is the clock tracing node of the third node, that is, R2 is a clock tracing node of R3. The first node is the clock tracing node of the second node, that is, R1 is the clock tracing node of R2.

With reference to the network scenario shown in FIG. 5, a solid line arrow is a direction of sending a synchronization detection request message, and a dashed line arrow is a direction of sending a synchronization detection response message. It can be learned from FIG. 5 that, on a clock synchronization path of R1→R2→R3→R4→R5, R1 initiates clock synchronization path detection, and synchronization detection response messages generated by R2, R3, R4, and R5 are sent to R1. A dashed line arrow from R2 to R1 is the first synchronization detection response message in FIG. 4A and FIG. 4B, a dashed line arrow from R3 to R1 is the second synchronization detection response message in FIG. 4A and FIG. 4B, a solid line arrow from R1 to R2 is the first synchronization detection request message in FIG. 4A and FIG. 4B, and a solid line arrow from R2 to R3 is the second synchronization detection request message in FIG. 4A and FIG. 4B. If R1 can receive the synchronization detection response messages sent by R2, R3, R4, and R5, R1 can obtain the complete clock synchronization path according to these synchronization detection response messages, and the complete clock synchronization path may be represented as R1→R2→R3→R4→R5.

If a link fault exists on the clock synchronization path of R1→R2→R3→R4→R5, R1 can obtain a part of the clock synchronization path. For example, if R1 can receive only synchronization detection response messages sent by R2 and R3, it may be deduced that a link fault exists between R3 and R4. Further, according to the clock synchronization path obtained by R1, an administrator may be prompted to detect a physical link in which a fault occurs.

In this embodiment of the present application, the first node may use the first synchronization path as a first detection result, and the first detection result is used to indicate a status of the clock synchronization path between the first node and the second node. That is, a process in which the first node obtains the first synchronization path is a process in which the first node obtains the first detection result.

In this embodiment of the present application, the first node generates the first synchronization detection request message, and sends the first synchronization detection request message to the second node. The second node feeds back the first synchronization detection response message to the first node according to the first synchronization detection request message. The first node obtains the first synchronization path according to the first synchronization detection response message. By analogy, the first node can efficiently obtain the clock synchronization path, and this helps determine a node with clock asynchronization according to the clock synchronization path.

Based on the method provided in Embodiment 2 of the present application, another embodiment of the present application provides a method for locating a fault on a clock synchronization path. The method for locating a fault on a clock synchronization path according to the other embodiment of the present application is described with reference to FIG. 4A and FIG. 4B and FIG. 5. In the following description, content same as that provided in Embodiment 1 and Embodiment 2 is not repeatedly described, and only content different from the methods provided in Embodiment 1 and Embodiment 2 is described.

Optionally, before step 204, the method further includes the following. The second node obtains first alarm information after detecting that a physical layer fault exists in the second node. The first alarm information is used to indicate that a physical layer fault exists in the node that sends the first synchronization detection response message. In step 204, that the second node generates a first synchronization detection response message according to the first synchronization detection request message further includes the following. The second node adds the first alarm information to the first synchronization detection response message.

Optionally, before or after or at the same time as step 206, the method further includes the following. The first node obtains a first alarm message according to the first synchronization detection response message, where the first alarm message is used to advertise that a physical layer fault exists in the node.

In the network scenario shown in FIG. 5, R1 may first detect whether a physical layer fault exists in the local node. If a physical layer fault exists in the local node, R1 outputs a first alarm message that is used to advertise that a physical layer fault exists in R1. If synchronization detection response messages received by R1 include a plurality of synchronization detection response messages that carry first alarm information, R1 may output first alarm messages according to a sequence of nodes on a clock synchronization path. For example, if physical layer faults exist in R2 and R3, R1 may first output a first alarm message that is used to advertise that a physical layer fault exists in R2. Then, R1 may output, after the physical layer fault in R2 is rectified, a first alarm message that is used to advertise that a physical layer fault exists in R3.

Based on the method provided in Embodiment 2 or the method provided in the other embodiment, still another embodiment of the present application provides another method that may be used to locate a fault. In the following description, content same as that provided in Embodiment 1 and Embodiment 2 is not repeatedly described, and only content different from the methods provided in Embodiment 1 and Embodiment 2 is described.

Optionally, before step 204, the method further includes the following. The second node obtains a second alarm information after detecting that a clock source of the second node is abnormal. The second alarm information is used to indicate that the node sending the first synchronization detection response message detects that the clock source of the node is abnormal.

Optionally, before or after or at the same time as step 206, the method further includes the following. The first node obtains a second alarm message according to the first synchronization detection response message, where the second alarm message is used to advertise that the clock source of the second node is abnormal, and the second alarm message includes the ID of the second node.

In the network scenario shown in FIG. 5, if a plurality of synchronization detection response messages received by R1, such as synchronization detection response messages sent by R2, R3, and R4, do not include the first alarm message but include the second alarm message, R1 may first output a second alarm message that is used to advertise that a clock source of R2 is abnormal. Then, R1 may detect, after a clock source exception of R2 is rectified, whether faults in R3 and R4 are rectified. When a fault in R3 or R4 is not rectified, R1 outputs a second alarm message that is used to advertise that a clock source is abnormal. Examples are not given one by one herein for illustration.

In this embodiment of the present application, by detecting whether a synchronization detection response message fed back by another node other than the first node includes the first alarm message or the second alarm message, a node in which a fault exists or a node indicated by an alarm on a clock synchronization path of the first node is obtained by means of analysis such that fault detection is implemented, and an administrator can conveniently process the alarm or the fault in a timely manner.

Based on the methods provided in the foregoing embodiments, yet another embodiment of the present application provides another method that may be used to determine performance degradation. In the following description, content same as that provided in the foregoing embodiments is not repeatedly described, and only content different from the methods provided in the foregoing embodiments is described.

Optionally, before step 204, the method further includes the following. The second node obtains performance monitoring information after detecting that frequency offset performance of the second node degrades.

Optionally, before or after or at the same time as step 206, the method further includes the following. The first node obtains a performance exception message according to the first synchronization detection response message, where the performance exception message is used to advertise that frequency offset performance of the node degrades, and the performance exception message includes the ID of the second node.

In the network scenario shown in FIG. 5, if frequency offset performance of R1 is within a normal range, and no frequency offset performance degradation is detected, R1 analyzes received synchronization detection response messages one by one. If synchronization detection response messages from R2 and R3 include performance monitoring information that indicates frequency offset performance degradation, and synchronization detection response messages from R2 and R1 do not include performance monitoring information that indicates frequency offset performance degradation, R1 outputs a performance exception message that is used to advertise that frequency offset performance of R2 degrades. After the frequency offset performance of R2 is recovered to normal, R1 performs monitoring again and determines whether frequency offset performance of R3 is normal. If the frequency offset performance of R3 is normal, a problem of frequency offset performance degradation is resolved. Otherwise, R1 resolves the problem of frequency offset performance degradation hop-by-hop with reference to a manner of rectifying the frequency offset performance degradation of R2.

In this embodiment of the present application, by detecting whether a frequency offset performance degradation exception exists in a synchronization detection response message fed back by another node other than the first node, a node whose performance is abnormal on a clock synchronization path of the first node is obtained by means of analysis such that performance detection of a node on the clock synchronization path is implemented, and an administrator can conveniently process a performance exception in a timely manner.

The plurality of embodiments for locating a fault and the embodiment for determining performance degradation above may be used as independent embodiments. If the plurality of embodiments for locating a fault and the embodiment for determining performance degradation above are used as independent embodiments, the plurality of embodiments do not include steps for obtaining the first synchronization path such as step 206 and step 211 in Embodiment 2. Correspondingly, the content added in the plurality of embodiments for locating a fault and the embodiment for determining performance degradation needs to be added to the plurality of embodiments.

Embodiment 3 of the present application provides a method for triggering clock synchronization path detection by a controller. In the method provided in Embodiment 3, a first node is the controller, a second node is R5 in FIG. 3, and a third node is R3 in FIG. 3. The method provided in Embodiment 3 of the present application is not repeatedly described herein. For details, refer to the method provided in Embodiment 1.

Embodiment 4 of the present application provides a method for triggering clock synchronization path detection by a controller. In the method provided in Embodiment 4, a first node is the controller, a second node is R1 in FIG. 5, and a third node is R2 in FIG. 5. Correspondingly, based on the method provided in Embodiment 2, step 201 and step 202 may be omitted in the method provided in Embodiment 4. Before step 203, the method further includes the following content the following. The controller generates a first synchronization detection request. A method for generating the first synchronization detection request by the controller is the same as the method for generating the first synchronization detection request by R1 in Embodiment 2. Details are not repeatedly described herein. Content that is in the method provided in Embodiment 4 and that is the same as that in Embodiment 2 is not repeatedly described herein. For details, refer to the method provided in Embodiment 2.

Figure 7:
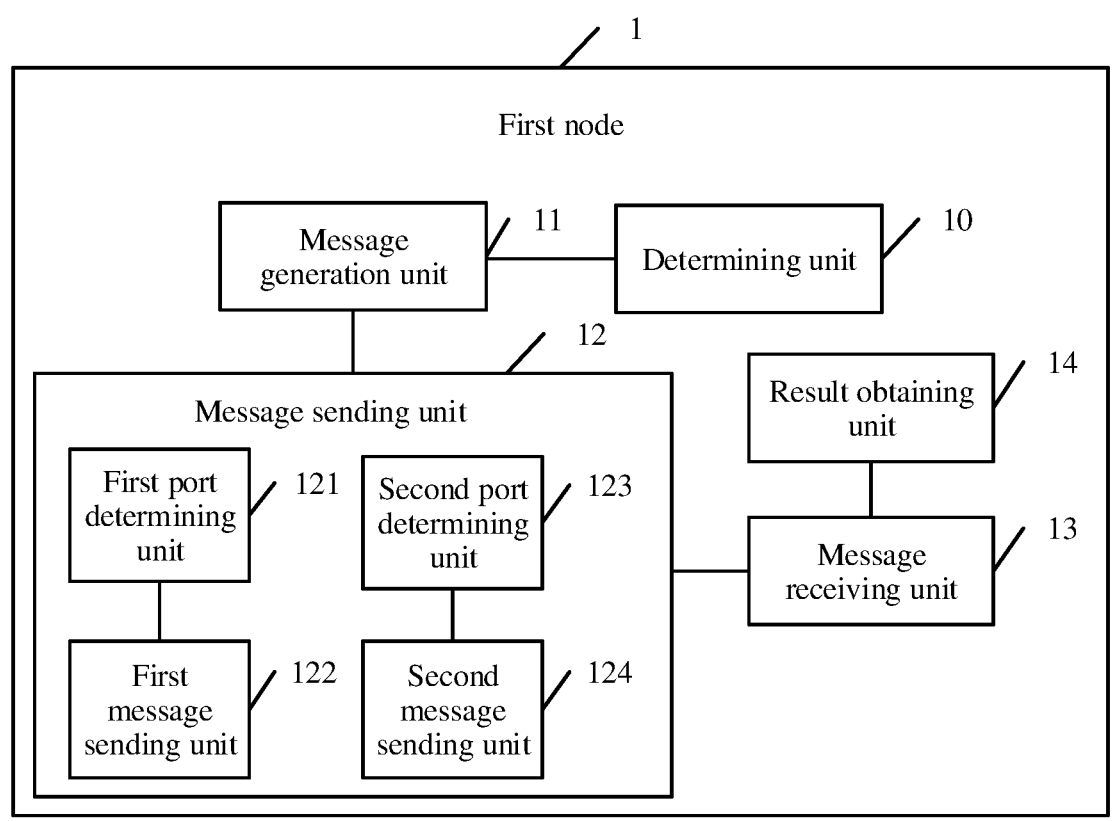
FIG. 7 is a schematic structural diagram of a first node according to an embodiment of the present application.

Referring to FIG. 7, FIG. 7 is a schematic structural diagram of a first node 1 according to an embodiment of the present application. The first node 1 provided in the embodiment corresponding to FIG. 7 may be the node that is configured to initiate clock synchronization path detection in any one of Embodiment 1 to Embodiment 4, for example, the first node in FIG. 2 or FIG. 4A and FIG. 4B. The first node 1 includes a message generation unit 11, a message sending unit 12, a message receiving unit 13, and a result obtaining unit 14. The message sending unit 12 includes a first port determining unit 121 and a first message sending unit 122, or the message sending unit 12 includes a second port determining unit 123 and a second message sending unit 124.

The message generation unit 11 is configured to generate a synchronization detection request message, where the synchronization detection request message includes an ID of the first node 1.

In specific implementation, the message generation unit 11 is configured to obtain clock topology information of the first node 1 when the first node is a node that initiates clock synchronization detection. The clock topology information of the first node 1 includes the ID of the first node 1 and a clock port list of the first node 1. Then, the first node 1 generates the synchronization detection request message according to the clock topology information of the first node 1. In this way, the synchronization detection request message includes the ID of the first node 1. For a specific execution process of the message generation unit 11, refer to step 101 in Embodiment 1 or step 202 in Embodiment 2.

The message sending unit 12 is configured to send the synchronization detection request message to a second node.

In specific implementation, the message sending unit 12 sends the synchronization detection request message to the second node using a port used to transmit a clock synchronization signal. The port used to transmit a clock synchronization signal is a port that is on the first node 1 and that can transmit a frequency synchronization signal to the second node. Because the synchronization detection request message may include a first synchronization type or a second synchronization type, the message sending unit 12 has two structures. The first synchronization type is used to represent frequency synchronization, and the synchronization detection request message is used to request to detect a frequency synchronization path. The second synchronization type is used to represent time synchronization, and the synchronization detection request message is used to request to detect a time synchronization path.

In an implementation, the message sending unit 12 includes the first port determining unit 121 configured to determine, according to the first synchronization type in the synchronization detection request message and the port used to transmit a clock synchronization signal, a port used to transmit a frequency synchronization signal, where the port used to transmit a frequency synchronization signal is a port that is on the first node 1 and that can transmit a frequency synchronization signal to the second node, and the first message sending unit 122 configured to send the synchronization detection request message to the second node using the port used to transmit a frequency synchronization signal and that is determined by the first port determining unit 121.

In another implementation, the message sending unit 12 includes the second port determining unit 123 configured to determine, according to the second synchronization type in the synchronization detection request message and the port used to transmit a clock synchronization signal, a port used to transmit a time synchronization signal, where the port used to transmit a time synchronization signal is a port that is on the first node 1 and that can transmit a time synchronization signal to the second node, and the second message sending unit 124 configured to send the synchronization detection request message to the second node using the port used to transmit a time synchronization signal and that is determined by the second port determining unit 123.

The message receiving unit 13 is configured to receive a first synchronization detection response message sent by the second node, where the first synchronization detection response message includes clock topology information of the second node and the ID of the first node 1.

The result obtaining unit 14 is configured to obtain a first detection result according to the first synchronization detection response message, where the first detection result is used to indicate a status of a clock synchronization path between the first node 1 and the second node.

In specific implementation, the result obtaining unit 14 extracts, according to the first synchronization detection response message that is sent by the second node and that is received by the message receiving unit 13, the clock topology information of the second node and the ID of the first node 1 that are included in the first synchronization detection response message, and then obtains a first synchronization path according to the clock topology information of the second node and the clock topology information of the first node 1. Corresponding to FIG. 3, the first synchronization path is R4→R5, and the second node is a clock tracing node of the first node 1, that is, R4 is a clock tracing node of R5. Corresponding to FIG. 5, the first synchronization path is R1→R2, and the first node 1 is a clock tracing node of the second node, that is, R1 is a clock tracing node of R2. The first node 1 may use the first synchronization path as the first detection result.

Optionally, in an implementation, the message receiving unit 13 is further configured to receive a second synchronization detection response message sent by a third node, where the second synchronization detection response message includes clock topology information of the third node, the clock topology information of the second node, and the ID of the first node 1, and the result obtaining unit 14 is further configured to obtain a second detection result according to the second synchronization detection response message, where the second detection result is used to indicate a status of a clock synchronization path between the first node 1 and the third node, and the clock synchronization path between the first node 1 and the third node passes through the second node.

Optionally, the first node further includes a determining unit 10. The determining unit 10 is configured to determine whether a clock tracing node of the first node 1 is traced. The message generation unit 11 is further configured to generate the synchronization detection request message after the determining unit determines that the clock tracing node of the first node 1 is traced.

For example, the first detection result includes the first synchronization path, the first synchronization path is the clock synchronization path between the first node 1 and the second node, and the clock topology information of the second node includes an ID of the second node. The result obtaining unit 14 is further configured to obtain the first synchronization path according to the ID of the second node and the ID of the first node 1 that are included in the first synchronization detection response message.

In this embodiment of the present application, the first node 1 generates the synchronization detection request message, and sends the synchronization detection request message to the second node. The second node feeds back the first synchronization detection response message to the first node 1 according to the synchronization detection request message. The first node 1 obtains the first synchronization path according to the first synchronization detection response message. By analogy, the first node 1 can efficiently obtain a clock synchronization path, and this helps determine a node with clock asynchronization according to the clock synchronization path.

Optionally, the clock topology information of the second node includes the ID of the second node, the first synchronization detection response message further includes first alarm information, the first alarm information is used to indicate that a physical layer fault exists in the node that sends the first synchronization detection response message, the first detection result further includes a first alarm message, and the first alarm message is used to advertise that a physical layer fault exists in the node.

The result obtaining unit 14 is further configured to determine, according to the first alarm information included in the first synchronization detection response message, that a physical layer fault exists in the second node, and generate the first alarm message according to the ID of the second node that is included in the first synchronization detection response message, where the first alarm message includes the ID of the second node.

Optionally, the clock topology information of the second node includes the ID of the second node, the first synchronization detection response message further includes second alarm information, the second alarm information is used to indicate that the node sending the first synchronization detection response message detects that a clock source of the node is abnormal, the first detection result includes or further includes a second alarm message, and the second alarm message is used to advertise that a clock source of the node is abnormal.

The result obtaining unit 14 is further configured to determine, according to the second alarm information included in the first synchronization detection response message, that the clock source of the second node is abnormal, and generate the second alarm message according to the ID of the second node that is included in the first synchronization detection response message, where the second alarm message includes the ID of the second node.

In this embodiment of the present application, by detecting whether a synchronization detection response message fed back by another node other than the first node includes the first alarm message or the second alarm message, a node in which a fault exists or a node indicated by an alarm on the clock synchronization path of the first node is obtained by means of analysis such that fault detection is implemented, and an administrator can conveniently process the alarm or the fault in a timely manner.

Optionally, the clock topology information of the second node includes the ID of the second node, the first synchronization detection response message further includes performance monitoring information, the performance monitoring information is used to determine frequency offset performance of the node that sends the first synchronization detection response message, the first detection result includes or further includes a performance exception message, and the performance exception message is used to advertise that frequency offset performance of the node degrades.

The result obtaining unit 14 is further configured to determine, according to the performance monitoring information included in the first synchronization detection response message, that the frequency offset performance of the second node degrades, and generate the performance exception message according to the ID of the second node that is included in the first synchronization detection response message, where the performance exception message includes the ID of the second node.

In this embodiment of the present application, by detecting whether a frequency offset performance degradation exception exists in a synchronization detection response message fed back by another node other than the first node 1, a node whose performance is abnormal on the clock synchronization path of the first node 1 is obtained by means of analysis such that performance detection of a node on the clock synchronization path is implemented, and an administrator can conveniently process a performance exception in a timely manner.

Figure 8:
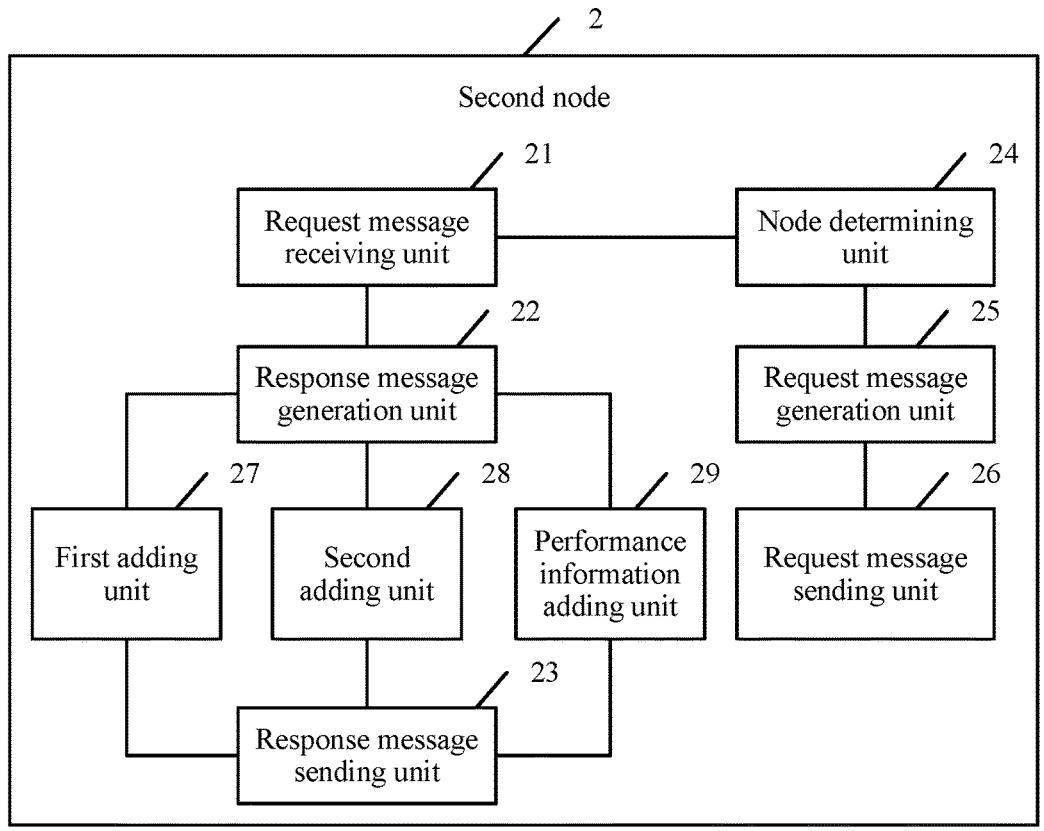
FIG. 8 is a schematic structural diagram of a second node according to an embodiment of the present application.

Referring to FIG. 8, FIG. 8 is a schematic structural diagram of a second node 2 according to an embodiment of the present application. The second node 2 includes a request message receiving unit 21, a response message generation unit 22, and a response message sending unit 23.

The response message generation unit 22 includes a port determining unit (not shown) and a message generation unit (not shown).

The request message receiving unit 21 is configured to receive a first synchronization detection request message sent by a first node, where the first synchronization detection request message includes clock topology information of the first node. In specific implementation, the request message receiving unit 21 receives the first synchronization detection request message sent by the message sending unit of the first node. If the first node is a node that initiates clock synchronization detection, the clock topology information of the first node includes an ID of the first node only. If the first node is not a node that initiates clock synchronization detection, the clock topology information of the first node includes the ID of the first node and a port list of the first node.

The response message generation unit 22 is configured to generate a synchronization detection response message according to the first synchronization detection request message, where the synchronization detection response message includes clock topology information of the second node 2 and the clock topology information of the first node.

The response message generation unit 22 includes the port determining unit and the message generation unit.

In an implementation, the port determining unit is configured to determine whether a port that is used by the request message receiving unit to receive the first synchronization detection request message is a port used to transmit a clock synchronization signal. The message generation unit is configured to generate the synchronization detection response message after it is determined that the port that receives the first synchronization detection request message is the port used to transmit a clock synchronization signal.

In another implementation, the port determining unit is configured to determine that a port that receives the first synchronization detection request message is a port used to transmit a frequency synchronization signal. The message generation unit is configured to add a first synchronization type to the synchronization detection response message, where the first synchronization type is used to represent frequency synchronization, and the first synchronization detection request message is used to request to detect a frequency synchronization path.

In still another implementation, the port determining unit is configured to determine that a port that receives the first synchronization detection request message is a port used to transmit a time synchronization signal. The message generation unit is configured to add a second synchronization type to the synchronization detection response message, where the second synchronization type is used to represent time synchronization, and the first synchronization detection request message is used to request to detect a time synchronization path.

The response message sending unit 23 is configured to send the synchronization detection response message.

In specific implementation, the response message sending unit 23 sends the synchronization detection response message to the node that initiates clock synchronization detection.

For example, the first node is the node that initiates clock synchronization detection, the clock topology information of the first node is the ID of the first node, and the response message sending unit 23 sends the synchronization detection response message to the message receiving unit of the first node according to the ID of the first node that is included in the first synchronization detection request message.

For example, the first synchronization detection request message further includes clock topology information of a fourth node, the synchronization detection response message further includes the clock topology information of the fourth node, the clock topology information of the fourth node is an ID of the fourth node, the fourth node is the node that initiates clock synchronization detection, and the response message sending unit 23 sends the synchronization detection response message to the fourth node according to the ID of the fourth node that is included in the first synchronization detection request message.

Optionally, the second node 2 further includes a node determining unit 24, a request message generation unit 25, and a request message sending unit 26.

The node determining unit 24 is configured to determine that a third node exists. That is, the node determining unit 24 determines that the second node 2 is not the last node on a to-be-detected clock synchronization path, that is, the third node exists. The request message generation unit 25 is configured to generate a second synchronization detection request message according to the first synchronization detection request message, where the third node is a node that can transmit a frequency synchronization signal to the second node 2, and the second synchronization detection request message includes the clock topology information of the first node and the clock topology information of the second node 2. The request message sending unit 26 is configured to send the second synchronization detection request message to the third node.

For example, if the third node is a clock tracing node of the second node 2, the request message sending unit 26 sends the second synchronization detection request message to the third node using a port used to receive a clock synchronization signal, where the port used to receive a clock synchronization signal is a port that is on the second node and that receives a clock synchronization signal provided by the third node. If the second node 2 is a clock tracing node of the third node, the request message sending unit 26 sends the second synchronization detection request message to the third node using a port used to send a clock synchronization signal.

In this embodiment of the present application, the second node 2 receives the first synchronization detection request message sent by the first node, generates the synchronization detection response message according to the first synchronization detection request message, and sends the synchronization detection response message to the first node or the node that initiates clock synchronization detection such that the first node or the node that initiates clock synchronization detection can efficiently obtain the clock synchronization path, and this helps the first node or the node that initiates clock synchronization detection determine a node with clock asynchronization according to the clock synchronization path.

Optionally, the second node 2 further includes a first adding unit 27 configured to add first alarm information to the synchronization detection response message after it is detected that a physical layer fault exists in the second node 2, where the first alarm information is used to indicate that a physical layer fault exists in the node that sends the synchronization detection response message.

Optionally, the second node further includes a second adding unit 28 configured to add second alarm information to the synchronization detection response message after it is detected that a clock source of the second node 2 is abnormal, where the second alarm information is used to indicate that the node sending the synchronization detection response message detects that the clock source of the node is abnormal.

Optionally, the second node further includes a performance information adding unit 29 configured to add performance monitoring information to the synchronization detection response message after it is detected that frequency offset performance of the second node degrades, where the performance monitoring information is used to indicate that the frequency offset performance of the node that sends the first synchronization detection response message degrades.

In this embodiment of the present application, when detecting that a fault or an exception exists in the second node 2 or performance of the second node degrades, fault information or exception information or performance degradation information is fed back to the first node such that the first node notifies an administrator for timely processing.

The first node 1 shown in FIG. 7 and the second node 2 shown in FIG. 8 are configured to implement content described in Embodiment 1 to Embodiment 4 of the present application. For parts that are not disclosed in FIG. 7 and FIG. 8, refer to specific descriptions in Embodiment 1 to Embodiment 4.

Figure 9:
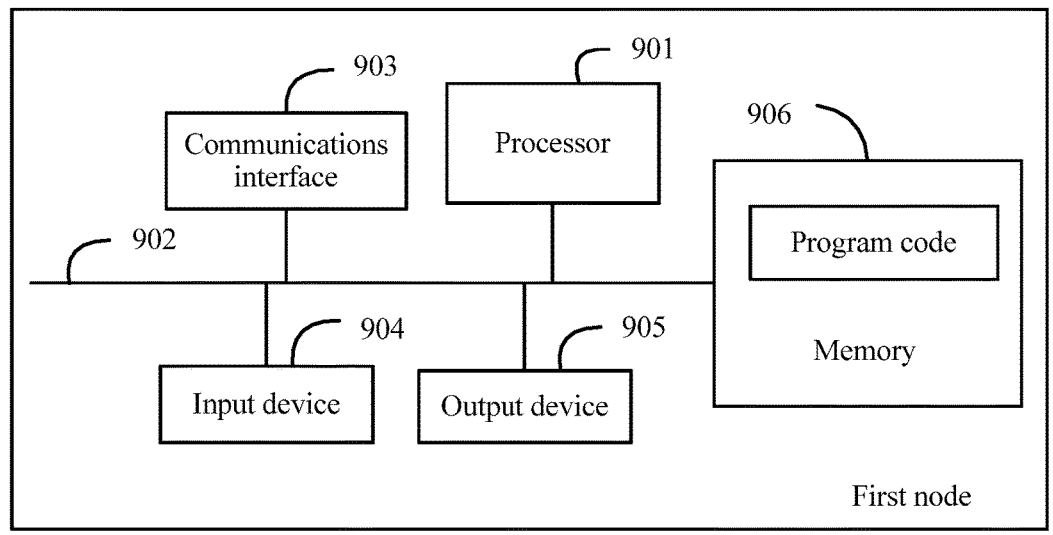
FIG. 9 is a schematic structural diagram of another first node according to an embodiment of the present application.

Referring to FIG. 9, FIG. 9 is a schematic structural diagram of another first node according to an embodiment of the present application. As shown in FIG. 9, the first node includes at least one processor 901 such as a central processing unit (CPU), at least one communications bus 902, a communications interface 903, an input device 904, an output device 905, and a memory 906. The communications bus 902 is configured to implement connections and communication between these components. The communications interface 903 may be a 1PPS+TOD interface and an Ethernet interface, and is configured to establish a communications connection between the first node and a BTS, or is configured to establish a connection between the first node and a BITS. The memory 906 may be a high-speed random access memory (RAM), or may be a nonvolatile memory, for example, at least one magnetic disk memory.

The processor 901 may include a determining unit, a message generation unit, and a result obtaining unit. The determining unit corresponds to the determining unit 10 in FIG. 7, and is configured to perform step 201 in Embodiment 2, or is configured to perform a step of determining whether a clock tracing node of the first node is traced in step 101 in Embodiment 1. The message generation unit corresponds to the message generation unit 11 in FIG. 7, and is configured to perform step 101 in Embodiment 1, or is configured to perform a step of generating a first synchronization detection request message in step 202 in Embodiment 2. The result obtaining unit corresponds to the result obtaining unit 14 in FIG. 7, and is configured to perform step 105 in Embodiment 1 or step 206 in Embodiment 2.

The input device 904 includes a message receiving unit corresponding to the message receiving unit 13 in FIG. 7. For a specific implementation of the message receiving unit, refer to a specific description of the message receiving unit 13 in the first node 1 shown in FIG. 7. The input device 904 may be a communications interface that has a receiving function in communications interfaces.

The output device 905 includes a message sending unit corresponding to the message sending unit 12 in FIG. 7. For a specific implementation of the message sending unit, refer to a specific description of the message sending unit 12 in the first node 1 shown in FIG. 7. The output device 905 may be a communications interface that has a sending function in communications interfaces.

Figure 10:
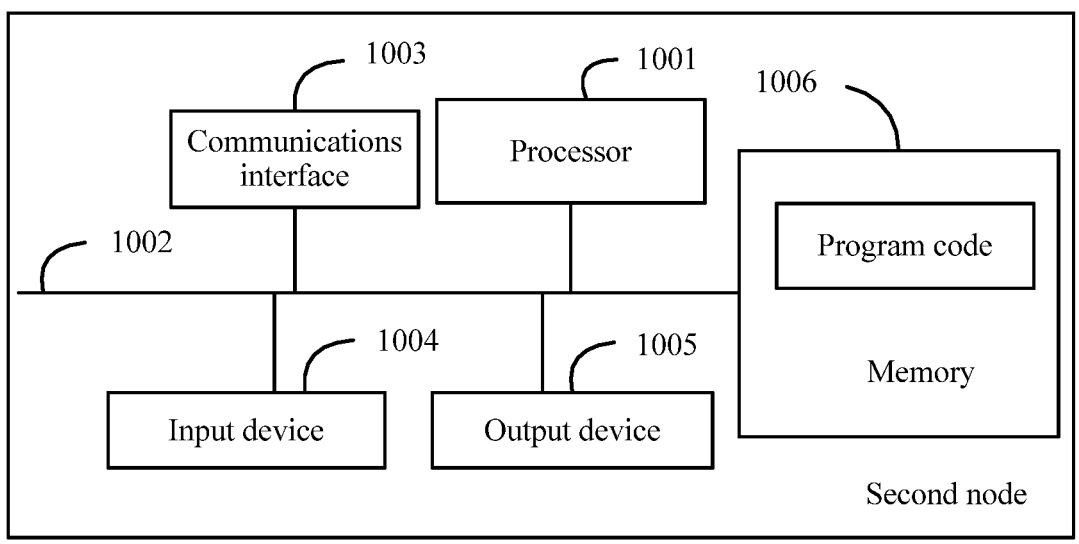
FIG. 10 is a schematic structural diagram of another second node according to an embodiment of the present application.

Referring to FIG. 10, FIG. 10 is a schematic structural diagram of another second node according to an embodiment of the present application. As shown in FIG. 10, the second node includes at least one processor 1001 such as a CPU, at least one communications bus 1002, a communications interface 1003, an input device 1004, an output device 1005, and a memory 1006. The second node is a device in a mobile bearer network, and the second node is neither connected to a BTS nor to a BITS. The communications bus 1002 is configured to implement connections and communication between these components. The communications interface 1003 is an interface that transmits a 1588v2 packet. In different bearer networks or transport networks, an interface of the communications interface 1003 may be different, and may be a 1PPS+TOD interface or another interface. This may be determined according to a specific situation. The memory 1006 may be a high-speed RAM, or may be a nonvolatile memory, for example, at least one magnetic disk memory.

The processor 1001 may include a response message generation unit, a node determining unit, a request message generation unit, a first adding unit, a second adding unit, and a performance information adding unit. The response message generation unit corresponds to the response message generation unit 22 in FIG. 8, and is configured to perform step 103 in Embodiment 1 or step 204 in Embodiment 2. The node determining unit 24 corresponds to the node determining unit 24 in FIG. 8. The request message generation unit corresponds to the request message generation unit 25 in FIG. 8. The node determining unit and the request message generation unit are configured to perform step 106 in Embodiment 1 or step 207 in Embodiment 2. The first adding unit, the second adding unit, and the performance information adding unit are respectively corresponding to the first adding unit 27, the second adding unit 28, and the performance information adding unit 29 in FIG. 8. The first adding unit, the second adding unit, and the performance information adding unit perform steps when the response message generation unit generates a synchronization detection response message or after the response message generation unit generates a synchronization detection response message.

The input device 1004 includes a request message receiving unit. The request message receiving unit corresponds to the request message receiving unit 21 in FIG. 8. For a specific implementation of the request message receiving unit, refer to a specific description of the request message receiving unit 21 in the second node shown in FIG. 8. The input device 1004 may be a communications interface that has a receiving function in communications interfaces.

The output device 1005 includes a response message sending unit and a request message sending unit. The response message sending unit corresponds to the response message sending unit 23 in FIG. 8, and is configured to implement step 104 in Embodiment 1 or step 205 in Embodiment 2. The request message generation unit corresponds to the request message sending unit 26 in FIG. 8, and is configured to perform step 107 in Embodiment 1 or step 208 in Embodiment 2. The output device 1005 may be a communications interface that has a sending function in communications interfaces.

It should be noted that the first node shown in FIG. 9 and the second node shown in FIG. 10 are configured to implement content described in Embodiment 1 to Embodiment 4 of the present application.

An embodiment of the present application further provides a system for detecting a clock synchronization path.

The system includes the first node shown in FIG. 7 or FIG. 9 and the second node shown in FIG. 8 or FIG. 10.

In the foregoing embodiments of the present application, a network node is a clock tracing node of another network node. This indicates that the network node is a node that directly provides a clock synchronization signal for the other network node. If frequency synchronization is implemented between the network node and the other network node, the network node is the clock tracing node of the other network node. This indicates that the network node is a node locked by the other network, and the network node directly provides a frequency synchronization signal for the other network node. In other words, the other network node may receive, using a port that is of the other network node and whose ID is slave, a frequency synchronization signal that is sent by the network node using a port whose ID is master.

The foregoing general purpose processor may be a microprocessor, or the processor may be any conventional processor. The steps of the method disclosed with reference to the embodiments of the present application may be directly performed by a hardware processor, or may be performed using a combination of hardware in the processor and a software module. When it is implemented using software, code that implements the foregoing functions may be stored in a computer readable medium. The computer readable medium includes a computer storage medium. The storage medium may be any available medium accessible to a computer. The following is used as an example but is not limited. The computer readable medium may be a RAM, a read-only memory (ROM), an electrically erasable programmable ROM (EEPROM), a compact disc ROM (CD-ROM) or other optical disk storage, a disk storage medium or another disk storage device, or any other medium that can be used to carry or store program code in a command or data structure form and can be accessed by a computer. The computer readable medium may be a compact disc (CD), a laser disc, a digital video disc (DVD), a floppy disk, or a BLU-RAY DISC.

Finally, it should be noted that the foregoing embodiments are merely intended for describing the technical solutions of the present application other than limiting the present application. Although the present application and benefits of the present application are described in detail with reference to the foregoing embodiments, a person of ordinary skill in the art should understand that they may still make modifications to the technical solutions described in the foregoing embodiments or make equivalent replacements to some technical features thereof, without departing from the scope of the claims of the present application.

What is claimed is:

1. A method for detecting a clock synchronization path between a first node and a second node, comprising:
   generating, by the first node, a synchronization detection request message comprising an identifier (ID) of the first node;
   sending, by the first node, the synchronization detection request message to the second node;
   receiving, by the first node, a first synchronization detection response message comprising clock topology information of the second node and the ID of the first node from the second node;
   obtaining, by the first node, a first detection result indicating a status of the clock synchronization path according to the first synchronization detection response message;
   prompting, by the first node, a network administrator to detect a physical link in which a fault occurs based on the first detection result;
   receiving, by the first node, a second synchronization detection response message comprising clock topology information of a third node, the clock topology information of the second node, and the ID of the first node from the third node; and
   obtaining, by the first node, a second detection result that indicates a second status of a second clock synchronization path between the first node and the third node and that passes through the second node according to the second synchronization detection response message.

2. The method of claim 1, wherein sending the synchronization detection request message to the second node comprises sending, by the first node, the synchronization detection request message to the second node using a port that transmits a clock synchronization signal, the port that transmits the clock synchronization signal, and the port is on the first node and can transmit a frequency synchronization signal to the second node.

3. The method of claim 2, wherein the synchronization detection request message further comprises a first synchronization type representing a frequency synchronization, wherein the synchronization detection request message requests detection of a frequency synchronization path, and wherein sending the synchronization detection request message to the second node using the port that transmits the clock synchronization signal comprises:
   determining, by the first node according to the first synchronization type in the synchronization detection request message and the port that transmits the clock synchronization signal, a second port that transmits the frequency synchronization signal, wherein the second port that transmits the frequency synchronization signal is on the first node and can transmit the frequency synchronization signal to the second node; and
   sending, by the first node, the synchronization detection request message to the second node using the port that transmits the frequency synchronization signal.

4. The method of claim 2, wherein the synchronization detection request message further comprises a second synchronization type representing time synchronization, wherein the synchronization detection request message requests detection of a time synchronization path, and wherein sending the synchronization detection request message to the second node comprises:
   determining, by the first node according to the second synchronization type in the synchronization detection request message and the port that transmits the clock synchronization signal, a third port that transmits a time synchronization signal, wherein the third port that transmits the time synchronization signal is on the first node and can transmit the time synchronization signal to the second node; and
   sending, by the first node, the synchronization detection request message to the second node using the port that transmits the time synchronization signal.

5. The method of claim 1, wherein before generating the synchronization detection request message, the method further comprises:
   determining, by the first node, whether a clock tracing node of the first node configured to directly provide a clock synchronization signal for the first node is traced; and determining, by the first node, that the clock tracing node of the first node is traced.

6. The method of claim 1, wherein the first detection result comprises a first synchronization path comprising the clock synchronization path, wherein the clock topology information of the second node comprises an ID of the second node, and wherein obtaining the first detection result comprises obtaining, by the first node, the first synchronization path according to the ID of the second node and the ID of the first node that is part of the first synchronization detection response message.

7. The method of claim 1, wherein the clock topology information of the second node comprises an ID of the second node, wherein the first synchronization detection response message further comprises first alarm information indicating that a physical layer fault exists in a node that sends the first synchronization detection response message, wherein the first detection result comprises a first alarm message advertising that the physical layer fault exists in the node that sent the first synchronization detection response message, and wherein obtaining the first detection result comprises:
determining, by the first node according to the first alarm information that is part of the first synchronization detection response message, that the physical layer fault exists in the second node; and
generating, by the first node, the first alarm message comprising the ID of the second node according to the ID of the second node that is part of the first synchronization detection response message.

8. The method of claim 1, wherein the clock topology information of the second node comprises an ID of the second node, wherein the first synchronization detection response message further comprises second alarm information indicating that a node that sent the first synchronization detection response message has detected that a clock source of the node that sent the first synchronization detection response message is abnormal, wherein the first detection result comprises a second alarm message advertising that the clock source of the node that sent the first synchronization detection response message is abnormal, and wherein obtaining the first detection result comprises:
determining, by the first node according to the second alarm information that is part of the first synchronization detection response message, that the clock source of the second node is abnormal; and
generating, by the first node, the second alarm message comprising the ID of the second node according to the ID of the second node that is part of the first synchronization detection response message.

9. The method of claim 1, wherein the clock topology information of the second node comprises an ID of the second node, wherein the first synchronization detection response message further comprises performance monitoring information indicating a frequency offset performance of a node that sent the first synchronization detection response message, wherein the first detection result comprises a performance exception message advertising that the frequency offset performance of the node that sent the first synchronization detection response message has degraded, and wherein obtaining the first detection result comprises:
determining, by the first node according to the performance monitoring information that is part of the first synchronization detection response message, that the frequency offset performance of the second node has degraded; and
generating, by the first node, the performance exception message comprising the ID of the second node according to the ID of the second node that is part of the first synchronization detection response message.

10. A method for detecting a clock synchronization path, comprising:
receiving, by a second node, a first synchronization detection request message comprising clock topology information of a first node from the first node;
generating, by the second node, a synchronization detection response message comprising clock topology information of the second node and the clock topology information of the first node according to the first synchronization detection request message;
sending, by the second node, the synchronization detection response message;
determining, by the second node, that a third node that can transmit a frequency synchronization signal to the second node exists;
generating, by the second node, a second synchronization detection request message comprising the clock topology information of the first node and the clock topology information of the second node; and
sending, by the second node, the second synchronization detection request message to the third node.

11. The method of claim 10, wherein the third node comprises a clock tracing node of the second node and is configured to directly provide a clock synchronization signal for the second node, wherein sending the second synchronization detection request message to the third node comprises sending, by the second node, the second synchronization detection request message to the third node using a port that receives the clock synchronization signal, and wherein the port that receives the clock synchronization signal is on the second node and receives the clock synchronization signal from the third node.

12. The method of claim 10, wherein the first node comprises a node initiating clock synchronization detection, wherein the clock topology information of the first node comprises an identifier (ID) of the first node, and wherein sending the synchronization detection response message comprises sending, by the second node, the synchronization detection response message to the first node according to the ID of the first node that is part of the first synchronization detection request message.

13. The method of claim 10, wherein the first synchronization detection request message further comprises clock topology information of a fourth node, wherein the clock topology information of the fourth node comprises an ID of the fourth node, wherein the synchronization detection response message further comprises the ID of the fourth node, wherein the fourth node comprises a node initiating clock synchronization detection, and wherein sending the synchronization detection response message comprises sending, by the second node, the synchronization detection response message to the fourth node according to the ID of the fourth node that is part of the first synchronization detection request message.

14. A first node, comprising:
a non-transitory memory storing instructions; and
a processor coupled to the non-transitory memory, wherein the instructions, when executed by the processor, cause the processor to be configured to:
generate a synchronization detection request message comprising an identifier (ID) of the first node;
send the synchronization detection request message to a second node;

receive a first synchronization detection response message comprising clock topology information of the second node and the ID of the first node from the second node;

obtain a first detection result indicating a status of a clock synchronization path between the first node and the second node according to the first synchronization detection response message;

prompt a network administrator to detect a physical link in which a fault occurs based on the first detection result;

receive a second synchronization detection response message comprising clock topology information of a third node, the clock topology information of the second node, and the ID of the first node from the third node; and obtain a second detection result that indicates a second status of a second clock synchronization path between the first node and the third node and that passes through the second node according to the second synchronization detection response message.

15. The first node according to claim 14, wherein the instructions further cause the processor to be configured to send the synchronization detection request message to the second node using a port that transmits a clock synchronization signal, and wherein the port that transmits the clock synchronization signal is on the first node and can transmit a frequency synchronization signal to the second node.

16. The first node according to claim 15, wherein the synchronization detection request message further comprises a first synchronization type representing a frequency synchronization, wherein the synchronization detection request message requests detection of a frequency synchronization path, and wherein the instructions further cause the processor to be configured to:

determine, according to the first synchronization type in the synchronization detection request message and the port that transmits the clock synchronization signal, a second port that transmits the frequency synchronization signal, wherein the second port that transmits the frequency synchronization signal is on the first node and can transmit the frequency synchronization signal to the second node; and send the synchronization detection request message to the second node using the port that transmits the frequency synchronization signal.

17. The first node according to claim 15, wherein the synchronization detection request message further comprises a second synchronization type representing time synchronization, wherein the synchronization detection request message requests detection of a time synchronization path, and wherein the instructions further causes the processor to be configured to:

determine, according to the second synchronization type in the synchronization detection request message and the port that transmits the clock synchronization signal, a third port that transmits a time synchronization signal, wherein the third port that transmits the time synchronization signal is on the first node and can transmit the time synchronization signal to the second node; and send the synchronization detection request message to the second node using the port that transmits the time synchronization signal.

18. The first node according to claim 14, wherein the instructions further cause the processor to be configured to:

determine whether a clock tracing node of the first node configured to directly provide a clock synchronization signal for the first node is traced; and generate the synchronization detection request message after determining that the clock tracing node of the first node is traced.

19. The first node according to claim 14, wherein the first detection result comprises a first synchronization path comprising the clock synchronization path, wherein the clock topology information of the second node comprises an ID of the second node, and wherein the instructions further cause the processor to be configured to obtain the first synchronization path according to the ID of the second node and the ID of the first node that is part of the first synchronization detection response message.

20. The first node according to claim 14, wherein the clock topology information of the second node comprises an ID of the second node, wherein the first synchronization detection response message further comprises first alarm information indicating that a physical layer fault exists in a node that sends the first synchronization detection response message, wherein the first detection result comprises a first alarm message advertising that the physical layer fault exists in the node that sent the first synchronization detection response message, and wherein the instructions further cause the processor to be configured to:

determine, according to the first alarm information that is part of the first synchronization detection response message, that the physical layer fault exists in the second node; and generate the first alarm message comprising the ID of the second node according to the ID of the second node that is part of the first synchronization detection response message.

21. The first node according to claim 14, wherein the clock topology information of the second node comprises an ID of the second node, wherein the first synchronization detection response message further comprises second alarm information indicating that a node that sent the first synchronization detection response message has detected that a clock source of the node that sent the first synchronization detection response message is abnormal, wherein the first detection result comprises a second alarm message advertising that the clock source of the node that sent the first synchronization detection response message is abnormal, and wherein the instructions further cause the processor to be configured to:

determine, according to the second alarm information that is part of the first synchronization detection response message, that the clock source of the second node is abnormal; and generate the second alarm message comprising the ID of the second node according to the ID of the second node that is part of the first synchronization detection response message.

22. The first node according to claim 14, wherein the clock topology information of the second node comprises an ID of the second node, wherein the first synchronization detection response message further comprises performance monitoring information indicating a frequency offset performance of a node that sent the first synchronization detection response message, wherein the first detection result comprises a performance exception message advertising that the frequency offset performance of the node that sent the first synchronization detection response message has degraded, and wherein the instructions further cause the processor to be configured to:

determine, according to the performance monitoring information that is part of the first synchronization detection response message, that the frequency offset performance of the second node has degraded; and generate the performance exception message comprising the ID of the second node according to the ID of the second node that is part of the first synchronization detection response message.

23. A second node, comprising:

a non-transitory memory storing instructions; and a processor coupled to the non-transitory memory, wherein when executed, the instructions cause the processor to be configured to:

receive a first synchronization detection request message comprising clock topology information of a first node from the first node;

generate a synchronization detection response message comprising clock topology information of the second node and the clock topology information of the first node according to the first synchronization detection request message;

send the synchronization detection response message;

determine that a third node that can transmit a frequency synchronization signal to the second node exists;

generate a second synchronization detection request message comprising the clock topology information of the first node and the clock topology information of the second node according to the first synchronization detection request message; and send the second synchronization detection request message to the third node.

24. The second node according to claim 23, wherein the third node comprises a clock tracing node of the second node configured to directly provide a clock synchronization signal for the second node, wherein the instructions further cause the processor to be configured to send the second synchronization detection request message to the third node using a port that receives the clock synchronization signal, and the port that receives the clock synchronization signal is on the second node and receives the clock synchronization signal from the third node.

25. The second node according to claim 23, wherein the first node comprises a node initiating clock synchronization detection, wherein the clock topology information of the first node comprises an identifier (ID) of the first node, and wherein the instructions further cause the processor to be configured to send the synchronization detection response message to the first node according to the ID of the first node that is part of the first synchronization detection request message.

26. The second node according to claim 23, wherein the first synchronization detection request message further comprises clock topology information of a fourth node, wherein the synchronization detection response message further comprises the clock topology information of the fourth node, wherein the clock topology information of the fourth node comprises an ID of the fourth node, wherein the fourth node comprises a node initiating clock synchronization detection, and wherein the instructions further cause the processor to be configured to send the synchronization detection response message to the fourth node according to the ID of the fourth node that is part of the first synchronization detection request message.

* * * * *